US012598610B2

(12) United States Patent
Liu et al.

(10) Patent No.: US 12,598,610 B2
(45) Date of Patent: Apr. 7, 2026

(54) USER EQUIPMENT, BASE STATION, AND COMMUNICATION METHOD

(71) Applicant: Sharp Kabushiki Kaisha, Sakai City (JP)

(72) Inventors: Liqing Liu, Sakai City (JP); Shohei Yamada, Sakai City (JP); Hiroki Takahashi, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 309 days.

(21) Appl. No.: 18/575,097

(22) PCT Filed: Jun. 24, 2022

(86) PCT No.: PCT/JP2022/026438
§ 371 (c)(1),
(2) Date: Dec. 28, 2023

(87) PCT Pub. No.: WO2023/277174
PCT Pub. Date: Jan. 5, 2023

(65) Prior Publication Data
US 2024/0349284 A1 Oct. 17, 2024

(30) Foreign Application Priority Data

Jun. 30, 2021 (JP) ................................. 2021-108389

(51) Int. Cl.
*H04W 72/20* (2023.01)
*H04L 5/00* (2006.01)
(Continued)

(52) U.S. Cl.
CPC ........... *H04W 72/20* (2023.01); *H04L 5/0055* (2013.01); *H04L 5/0094* (2013.01);
(Continued)

(58) Field of Classification Search
CPC ..... H04W 72/20; H04W 72/21; H04W 72/12; H04W 72/1263; H04W 72/1273;
(Continued)

(56) References Cited

U.S. PATENT DOCUMENTS

| | | | |
|---|---|---|---|
| 12,289,739 B2 * | 4/2025 | Liu ........................ | H04W 72/23 |
| 2022/0225360 A1 * | 7/2022 | Yi .......................... | H04W 72/21 |

(Continued)

FOREIGN PATENT DOCUMENTS

| | | | | |
|---|---|---|---|---|
| WO | WO-2019139976 A1 * | 7/2019 | ........ | H04W 74/0833 |
| WO | 2021065857 A1 | 4/2021 | | |
| WO | WO-2022089334 A1 * | 5/2022 | ............ | H04W 72/23 |

OTHER PUBLICATIONS

Interdigital, Inc., "Reduced maximum bandwidth for RedCap UEs", 3GPP TSG RAN WG1 #105-e, R1-2105746, May 11, 2021 (Year: 2021).*

(Continued)

*Primary Examiner* — Joshua Kading
(74) *Attorney, Agent, or Firm* — Keating & Bennett, LLP

(57) ABSTRACT

A communication method by a user equipment (UE) is described. The method includes receiving, from a base station, system information including a first RRC parameter, wherein the first RRC parameter provides a cell-specific physical uplink control channel (PUCCH) resource set and the cell-specific PUCCH resource set includes one or more PUCCH resources; and receiving a PDCCH with a DCI format scheduling a PDSCH; and performing, on a PUCCH resource of the cell-specific PUCCH resource set in an initial UL BWP, a PUCCH transmission with HARQ-ACK information in response to the PDSCH received, wherein whether a PRB index of the PUCCH transmission is determined (Continued)

1200

1202 — receive system information including a first RRC parameter providing a cell specific PUCCH resource set 1204 — receive a PDCCH with a DCI format scheduling a PDSCH 1206 — whether a sixth RRC parameter is included in the system information or not?

1208 — PRB index of a PUCCH transmission is determined based on the size of initial UL BWP 1210 — PRB index of a PUCCH transmission is determined not based on the size of initial UL BWP based on a size of the initial UL BWP or not based on a size of the initial UL BWP is determined based on a second RRC parameter.

7 Claims, 15 Drawing Sheets

(51) Int. Cl.
  *H04W 72/1263* (2023.01)
  *H04W 72/21* (2023.01)
  *H04L 1/1829* (2023.01)

(52) U.S. Cl.
  CPC ....... *H04W 72/1263* (2013.01); *H04W 72/21* (2023.01); *H04L 1/1854* (2013.01); *H04L 5/0012* (2013.01)

(58) Field of Classification Search
  CPC ... H04L 5/0055; H04L 5/0094; H04L 5/0012; H04L 5/0091; H04L 5/0092; H04L 1/1854
  See application file for complete search history.

(56) References Cited

U.S. PATENT DOCUMENTS

2022/0360407 A1    11/2022  Lee et al.
2024/0073876 A1*    2/2024  Liu ....................... H04L 5/0055

OTHER PUBLICATIONS

Official Communication issued in International Patent Application No. PCT/JP2022/026438, mailed on Sep. 6, 2022.
"3rd Generation Partnership Project; Technical Specification Group Radio Access Network; NR; Radio Resource Control (RRC) protocol specification (Release 16)", 3GPP TS 38.331 V16.4.1, Mar. 2021, pp. 1-949.
"3rd Generation Partnership Project; Technical Specification Group Radio Access Network; NR; Medium Access Control (MAC) protocol specification (Release 16)", 3GPP TS 38.321 V16.4.0, Mar. 2021, pp. 1-157.
"3rd Generation Partnership Project; Technical Specification Group Radio Access Network; NR; NR and NG-RAN Overall Description; Stage 2 (Release 16)", 3GPP TS 38.300 V16.5.0, Mar. 2021, pp. 1-151.
"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340 V16.5.0, Mar. 2021, pp. 1-84.
"3rd Generation Partnership Project; Technical Specification Group Radio Access Network; NR; Physical channels and modulation (Release 16)", 3GPP TS 38.211 V16.5.0, Mar. 2021, pp. 1-134.
"3rd Generation Partnership Project; Technical Specification Group Radio Access Network; NR; Multiplexing and channel coding (Release 16)", 3GPP TS 38.212 V16.5.0, Mar. 2021, pp. 1-152.
"3rd Generation Partnership Project; Technical Specification Group Radio Access Network; NR; Physical layer procedures for control (Release 16)", 3GPP TS 38.213 V16.5.0, Mar. 2021, pp. 1-183.
"3rd Generation Partnership Project; Technical Specification Group Radio Access Network; NR; Physical layer procedures for data (Release 16)", 3GPP TS 38.214 V16.5.0, Mar. 2021, pp. 1-171.
Sharp, "Discussion on reduced maximum UE bandwidth", 3GPP TSG RAN WG1 #107-e, R1-2112015, Nov. 11-19, 2021, 11 pages.

* cited by examiner

*700*

UE                                                                    Base station Random access preamble in a PRACH

*S701*

RAR message

*S702*

A PUSCH scheduled by a RAR UL grant

*S703*

DCI format 0_0 with TC-RNTI

*S703a*

Retransmission of the PUSCH

*S703b*

PDSCH for contention resolution

*S704*

*800*

Random Access Response Grant Content field size

| RAR grant field | Number of bits |
|---|---|
| Frequency hopping flag | 1 |
| PUSCH frequency resource allocation | 14 |
| PUSCH time domain allocation | 4 |
| MCS | 4 |
| TPC command for PUSCH | 3 |
| CSI request | 1 |

FIG. 8

| Index | PUCCH format | First symbol | Number of symbols | PRB offset $RB^{offset}_{BWP}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N^{size}_{BWP}/4 \rfloor$ | {0, 3, 6, 9} |

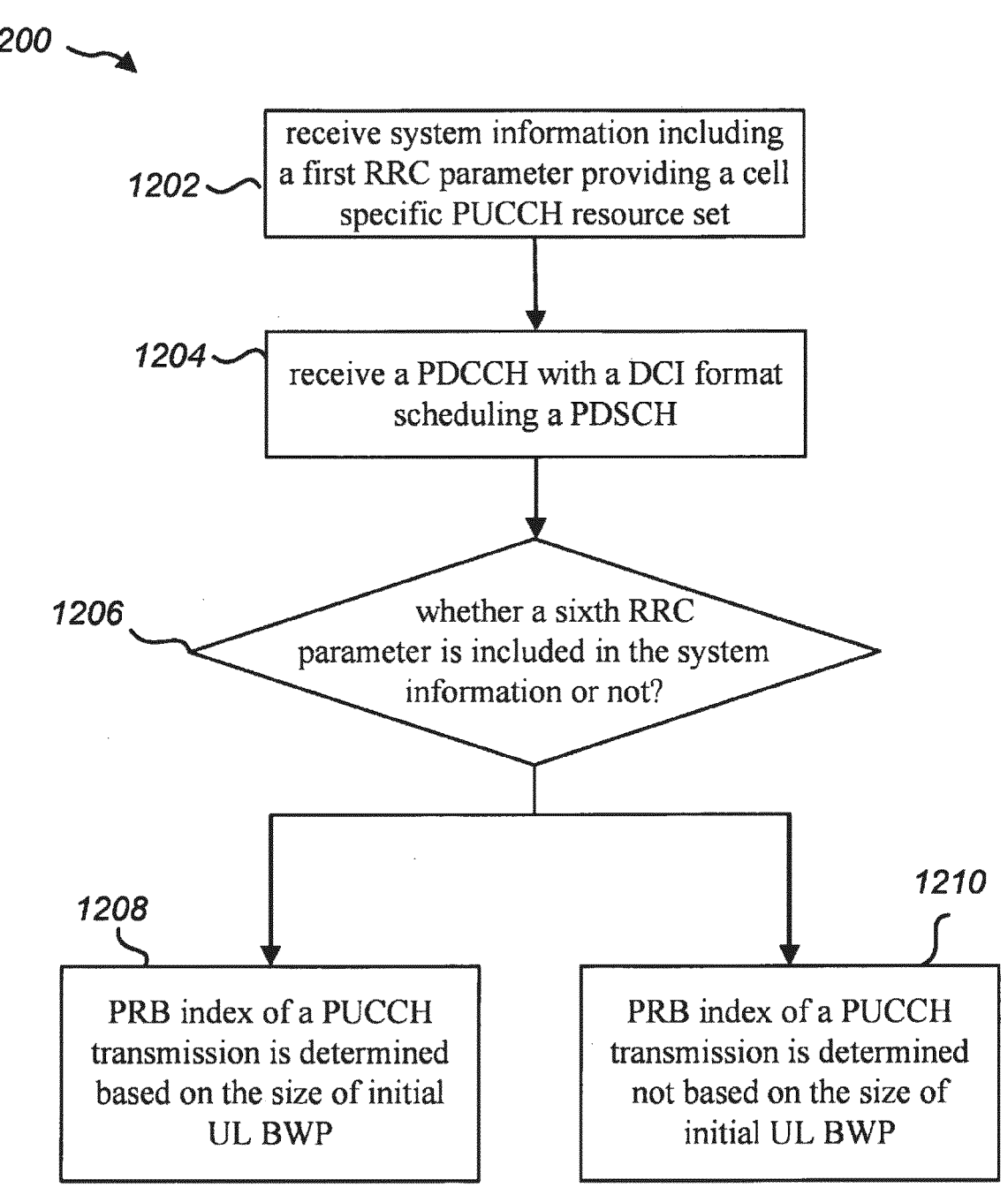

1202 — receive system information including a first RRC parameter providing a cell specific PUCCH resource set 1204 — receive a PDCCH with a DCI format scheduling a PDSCH 1206 — whether a sixth RRC parameter is included in the system information or not?

1208 — PRB index of a PUCCH transmission is determined based on the size of initial UL BWP 1210 — PRB index of a PUCCH transmission is determined not based on the size of initial UL BWP

FIG. 12

USER EQUIPMENT, BASE STATION, AND COMMUNICATION METHOD

TECHNICAL FIELD

The present disclosure relates to a user equipment, a base station, and a communication method.

BACKGROUND ART

At present, as a radio access system and a radio network technology aimed for the fifth generation cellular system, technical investigation and standard development are being conducted, as extended standards of Long Term Evolution (LTE), on LTE-Advanced Pro (LTE-A Pro) and New Radio technology (NR) in The Third Generation Partnership Project (3GPP).

In the fifth generation cellular system, three services of enhanced Mobile BroadBand (eMBB) to achieve high-speed and large-volume transmission, Ultra-Reliable and Low Latency Communication (URLLC) to achieve low-latency and high-reliability communication, and massive Machine Type Communication (mMTC) to allow connection of a large number of machine type devices such as Internet of Things (IoT) have been demanded as assumed scenarios.

For example, wireless communication devices may communicate with one or more devices for multiple service types. For some device types, a lower complexity would be required such as to reduce the Rx/Tx antennas and/or the RF/Baseband bandwidth to reduce the UE complexity and the UE cost. However, given the reduced antennas and/or the bandwidth, the flexibility and/or the efficiency of the whole system would be limited. As illustrated by this discussion, systems and methods according to the present invention, supporting PUCCH frequency hopping indication and/or PRB index determination of a PUCCH transmission, may improve the communication flexibility and/or efficiency and be beneficial.

BRIEF DESCRIPTION OF THE DRAWINGS

FIG. 8 is a diagram illustrating one 800 example of fields included in an RAR UL grant;

FIG. 9 is a diagram illustrating one example of one predefined table 900 associated to cell specific PUCCH resource configuration;

FIG. 12 is a flow diagram illustrating one implementation of a method 1200 for determining PRB index of a PUCCH transmission without frequency hopping by a UE 102;

DESCRIPTION OF EMBODIMENTS

Figure 1:
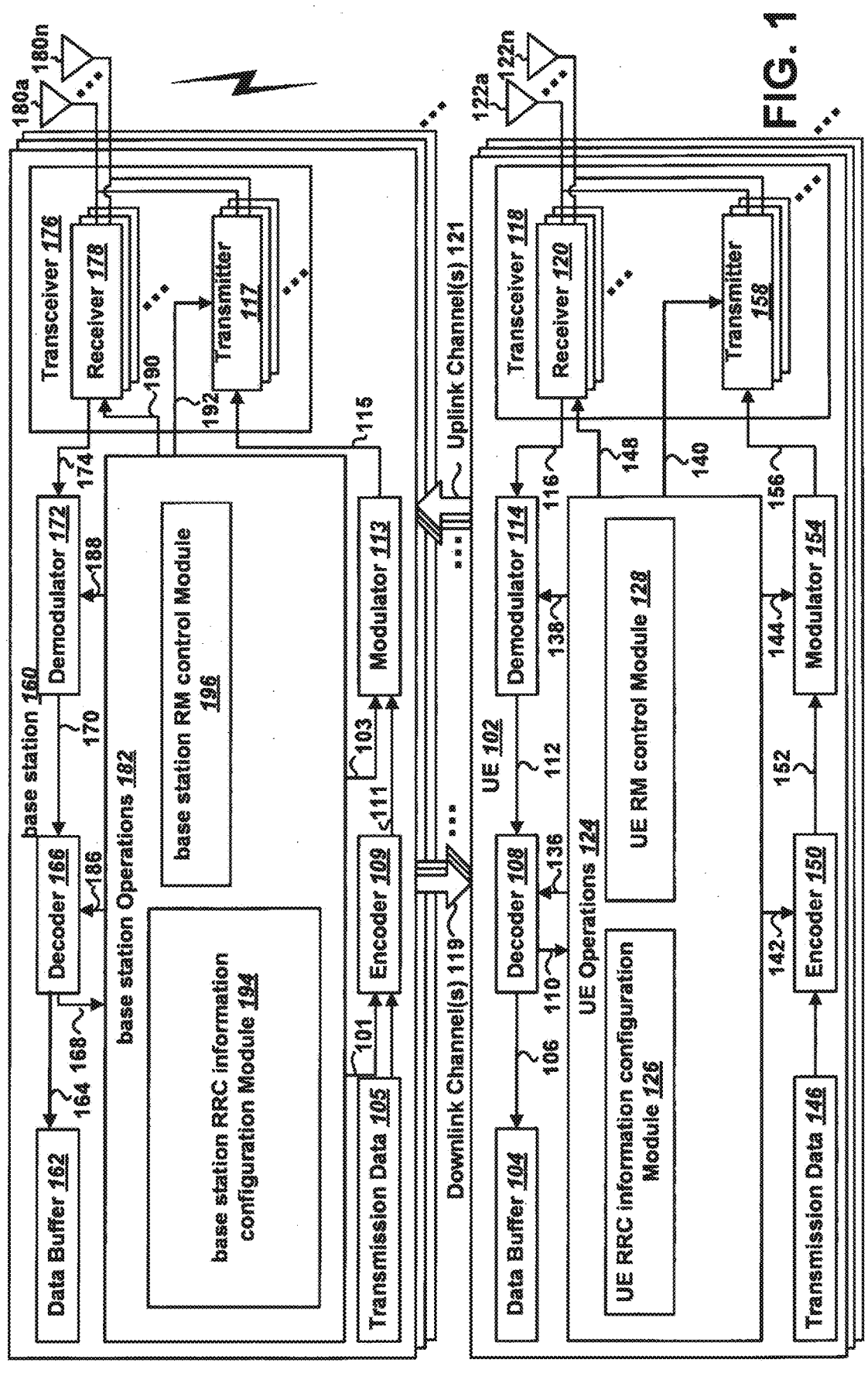
FIG. 1 is a block diagram illustrating one configuration of one or more base stations and one or more user equipments (UEs) in which systems and methods for PUCCH transmission with or without frequency hopping may be implemented.

A communication method by a user equipment (UE) is described. The method includes receiving, from a base station, system information including a first RRC parameter, wherein the first RRC parameter provides a cell-specific physical uplink control channel (PUCCH) resource set and the cell-specific PUCCH resource set includes one or more PUCCH resources; and receiving a PDCCH with a DCI format scheduling a PDSCH; and performing, on a PUCCH resource of the cell-specific PUCCH resource set in an initial UL BWP, a PUCCH transmission with HARQ-ACK information in response to the PDSCH received, wherein whether a PRB index of the PUCCH transmission is determined based on a size of the initial UL BWP or not based on a size of the initial UL BWP is determined based on a second RRC parameter.

A communication method by a base station is described. The method includes transmitting, to a user equipment (UE), system information including a first RRC parameter, wherein the first RRC parameter provides a cell-specific physical uplink control channel (PUCCH) resource set and the cell-specific PUCCH resource set includes one or more PUCCH resources; and transmitting a PDCCH with a DCI format scheduling a PDSCH; and receiving, on a PUCCH resource of the cell-specific PUCCH resource set in an initial UL BWP, a PUCCH transmission with HARQ-ACK information in response to the PDSCH received, wherein whether a PRB index of the PUCCH transmission is determined based on a size of the initial UL BWP or not based on a size of the initial UL BWP is determined based on a second RRC parameter.

A user equipment (UE) is described. The UE includes reception circuitry configured to receive, from a base station, system information including a first RRC parameter, wherein the first RRC parameter provides a cell-specific physical uplink control channel (PUCCH) resource set and the cell-specific PUCCH resource set includes one or more PUCCH resources, and to receive a PDCCH with a DCI format scheduling a PDSCH; and transmission circuitry configured to perform, on a PUCCH resource of the cell-specific PUCCH resource set in an initial UL BWP, a PUCCH transmission with HARQ-ACK information in response to the PDSCH received, wherein whether a PRB index of the PUCCH transmission is determined based on a size of the initial UL BWP or not based on a size of the initial UL BWP is determined based on a second RRC parameter.

A base station is described. The base station includes transmission circuitry configured to transmit, to a user equipment (UE), system information including a first RRC parameter, wherein the first RRC parameter provides a cell-specific physical uplink control channel (PUCCH) resource set and the cell-specific PUCCH resource set includes one or more PUCCH resources, and to transmit a PDCCH with a DCI format scheduling a PDSCH; and reception circuitry configured to receive, on a PUCCH resource of the cell-specific PUCCH resource set in an initial UL BWP, a PUCCH transmission with HARQ-ACK information in response to the PDSCH received, wherein whether a PRB index of the PUCCH transmission is determined based on a size of the initial UL BWP or not based on a size of the initial UL BWP is determined based on a second RRC parameter.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN). 3GPP NR (New Radio) is the name given to a project to improve the LTE mobile phone or device standard to cope with future requirements. In one aspect, LTE has been modified to provide support and specification (TS 38.331, 38.321, 38.300, 37.300, 38.211, 38.212, 38.213, 38.214, etc) for the New Radio Access (NR) and Next generation—Radio Access Network (NG-RAN).

At least some aspects of the systems and methods disclosed herein may be described in relation to the 3GPP LTE, LTE-Advanced (LTE-A), LTE-Advanced Pro, New Radio Access (NR), and other 3G/4G/5G standards (e.g., 3GPP Releases 8, 9, 10, 11, 12, 13, 14, 15, and/or 16, and/or Narrow Band-Internet of Things (NB-IoT)). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE (User Equipment), an access terminal, a subscriber station, a mobile terminal, a remote station, a user terminal, a terminal, a subscriber unit, a mobile device, a relay node, etc. Examples of wireless communication devices include cellular phones, smart phones, personal digital assistants (PDAs), laptop computers, netbooks, e-readers, wireless modems, industrial wireless sensors, video surveillance, wearables, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a gNB, a Node B, an eNB, a home enhanced or evolved Node B (HeNB) or some other similar terminology. As the scope of the disclosure should not be limited to 3GPP standards, the terms "base station,", "gNB", "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.)

for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced), IMT-2020 (5G) and all of it or a subset of it may be adopted by 3GPP as licensed bands (e.g., frequency bands) to be used for communication between a base station and a UE. It should also be noted that in NR, NG-RAN, E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by a base station to transmit or receive information. "Configured cell(s)" may be serving cell(s). The UE may receive system information and perform the required measurements on configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The base stations may be connected by the NG interface to the 5G—core network (5G-CN). 5G-CN may be called as to NextGen core (NGC), or 5G core (5GC). The base stations may also be connected by the S1 interface to the evolved packet core (EPC). For instance, the base stations may be connected to a NextGen (NG) mobility management function by the NG-2 interface and to the NG core User Plane (UP) functions by the NG-3 interface. The NG interface supports a many-to-many relation between NG mobility management functions, NG core UP functions and the base stations. The NG-2 interface is the NG interface for the control plane and the NG-3 interface is the NG interface for the user plane. For instance, for EPC connection, the base stations may be connected to a mobility management entity (MME) by the S1-MME interface and to the serving gateway (S-GW) by the S1-U interface. The S1 interface supports a many-to-many relation between MMEs, serving gateways and the base stations. The S1-MME interface is the S1 interface for the control plane and the S1-U interface is the S1 interface for the user plane. The Uu interface is a radio interface between the UE and the base station for the radio protocol.

The radio protocol architecture may include the user plane and the control plane. The user plane protocol stack may include packet data convergence protocol (PDCP), radio link control (RLC), medium access control (MAC) and physical (PHY) layers. A DRB (Data Radio Bearer) is a radio bearer that carries user data (as opposed to control plane signaling). For example, a DRB may be mapped to the user plane protocol stack. The PDCP, RLC, MAC and PHY sublayers (terminated at the base station 460a on the network) may perform functions (e.g., header compression, ciphering, scheduling, ARQ and HARQ) for the user plane. PDCP entities are located in the PDCP sublayer. RLC entities may be located in the RLC sublayer. MAC entities may be located in the MAC sublayer. The PHY entities may be located in the PHY sublayer.

The control plane may include a control plane protocol stack. The PDCP sublayer (terminated in base station on the network side) may perform functions (e.g., ciphering and integrity protection) for the control plane. The RLC and MAC sublayers (terminated in base station on the network side) may perform the same functions as for the user plane. The Radio Resource Control (RRC) (terminated in base station on the network side) may perform the following functions. The RRC may perform broadcast functions, paging, RRC connection management, radio bearer (RB) control, mobility functions, UE measurement reporting and control. The Non-Access Stratum (NAS) control protocol (terminated in MME on the network side) may perform, among other things, evolved packet system (EPS) bearer management, authentication, evolved packet system connection management (ECM)-IDLE mobility handling, paging origination in ECM-IDLE and security control.

Signaling Radio Bearers (SRBs) are Radio Bearers (RB) that may be used only for the transmission of RRC and NAS messages. Three SRBs may be defined. SRB0 may be used for RRC messages using the common control channel (CCCH) logical channel. SRB1 may be used for RRC messages (which may include a piggybacked NAS message) as well as for NAS messages prior to the establishment of SRB2, all using the dedicated control channel (DCCH) logical channel. SRB2 may be used for RRC messages which include logged measurement information as well as for NAS messages, all using the DCCH logical channel. SRB2 has a lower-priority than SRB1 and may be configured by a network (e.g., base station) after security activation. A broadcast control channel (BCCH) logical channel may be used for broadcasting system information. Some of BCCH logical channel may convey system information which may be sent from the network to the UE via BCH (Broadcast Channel) transport channel. BCH may be sent on a physical broadcast channel (PBCH). Some of BCCH logical channel may convey system information which may be sent from the network to the UE via DL-SCH (Downlink Shared Channel) transport channel. Paging may be provided by using paging control channel (PCCH) logical channel.

For example, the DL-DCCH logical channel may be used (but not limited to) for a RRC reconfiguration message, a RRC reestablishment message, a RRC release, a UE Capability Enquiry message, a DL Information Transfer message or a Security Mode Command message. UL-DCCH logical channel may be used (but not limited to) for a measurement report message, a RRC Reconfiguration Complete message, a RRC Reestablishment Complete message, a RRC Setup Complete message, a Security Mode Complete message, a Security Mode Failure message, a UE Capability Information, message, a UL Handover Preparation Transfer message, a UL Information Transfer message, a Counter Check Response message, a UE Information Response message, a Proximity Indication message, a RN (Relay Node) Reconfiguration Complete message, an MBMS Counting Response message, an inter Frequency RSTD Measurement Indication message, a UE Assistance Information message, an In-device Coexistence Indication message, an MBMS Interest Indication message, an SCG Failure Information message. DL-CCCH logical channel may be used (but not limited to) for a RRC Connection Reestablishment message, a RRC Reestablishment Reject message, a RRC Reject message, or a RRC Setup message. UL-CCCH logical channel may be used (but not limited to) for a RRC Reestablishment Request message, or a RRC Setup Request message.

System information may be divided into the MasterInformationBlock (MIB) and a number of SystemInformationBlocks (SIBs).

The UE may receive one or more RRC messages from the base station to obtain RRC configurations or parameters. The RRC layer of the UE may configure RRC layer and/or lower layers (e.g., PHY layer, MAC layer, RLC layer, PDCP layer) of the UE according to the RRC configurations or parameters which may be configured by the RRC messages, broadcasted system information, and so on. The base station may transmit one or more RRC messages to the UE to cause the UE to configure RRC layer and/or lower layers of the UE according to the RRC configurations or parameters which may be configured by the RRC messages, broadcasted system information, and so on.

When carrier aggregation is configured, the UE may have one RRC connection with the network. One radio interface may provide carrier aggregation. During RRC establishment, re-establishment and handover, one serving cell may provide Non-Access Stratum (NAS) mobility information (e.g., a tracking area identity (TAI)). During RRC re-establishment and handover, one serving cell may provide a security input. This cell may be referred to as the primary cell (PCell). In the downlink, the component carrier corresponding to the PCell may be the downlink primary component carrier (DL PCC), while in the uplink it may be the uplink primary component carrier (UL PCC). In the present disclosure, the terms "component carrier" and "carrier" can be interchanged with each other.

Depending on UE capabilities, one or more SCells may be configured to form together with the PCell a set of serving cells. In the downlink, the component carrier corresponding to an SCell may be a downlink secondary component carrier (DL SCC), while in the uplink it may be an uplink secondary component carrier (UL SCC).

The configured set of serving cells for the UE, therefore, may consist of one PCell and one or more SCells. For each SCell, the usage of uplink resources by the UE (in addition to the downlink resources) may be configurable. The number of DL SCCs configured may be larger than or equal to the number of UL SCCs and no SCell may be configured for usage of uplink resources only.

From a UE viewpoint, each uplink resource may belong to one serving cell. The number of serving cells that may be configured depends on the aggregation capability of the UE. The PCell may only be changed using a handover procedure (e.g., with a security key change and a random access procedure). A PCell may be used for transmission of the PUCCH. A primary secondary cell (PSCell) may also be used for transmission of the PUCCH. The PSCell may be referred to as a primary SCG cell or SpCell of a secondary cell group. The PCell or PSCell may not be de-activated. Re-establishment may be triggered when the PCell experiences radio link failure (RLF), not when the SCells experience RLF. Furthermore, NAS information may be taken from the PCell.

The reconfiguration, addition and removal of SCells may be performed by RRC. At handover or reconfiguration with sync, Radio Resource Control (RRC) layer may also add, remove or reconfigure SCells for usage with a target PCell. When adding a new SCell, dedicated RRC signaling may be used for sending all required system information of the SCell (e.g., while in connected mode, UEs need not acquire broadcasted system information directly from the SCells).

The systems and methods described herein may enhance the efficient use of radio resources in Carrier aggregation (CA) operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single base station is assumed to provide multiple serving cells for a UE. Even in scenarios where two or more cells may be aggregated (e.g., a macro cell aggregated with remote radio head (RRH) cells) the cells may be controlled (e.g., scheduled) by a single base station. However, in a small cell deployment scenario, each node (e.g., base station, RRH, etc.) may have its own independent scheduler. To maximize the efficiency of radio resources utilization of both nodes, a UE may connect to two or more nodes that have different schedulers. The systems and methods described herein may enhance the efficient use of radio resources in dual connectivity operation. A UE may be configured multiple groups of serving cells, where each group may have carrier aggregation operation (e.g., if the group includes more than one serving cell).

In Dual Connectivity (DC) the UE may be required to be capable of UL-CA with simultaneous PUCCH/PUCCH and PUCCH/PUSCH transmissions across cell-groups (CGs). In a small cell deployment scenario, each node (e.g., eNB, RRH, etc.) may have its own independent scheduler. To maximize the efficiency of radio resources utilization of both nodes, a UE may connect to two or more nodes that have different schedulers. A UE may be configured multiple groups of serving cells, where each group may have carrier aggregation operation (e.g., if the group includes more than one serving cell). A UE in RRC_CONNECTED may be configured with Dual Connectivity or MR-DC, when configured with a Master and a Secondary Cell Group. A Cell Group (CG) may be a subset of the serving cells of a UE, configured with Dual Connectivity (DC) or MR-DC, i.e. a Master Cell Group (MCG) or a Secondary Cell Group (SCG). The Master Cell Group may be a group of serving cells of a UE comprising of the PCell and zero or more secondary cells. The Secondary Cell Group (SCG) may be a group of secondary cells of a UE, configured with DC or MR-DC, comprising of the PSCell and zero or more other secondary cells. A Primary Secondary Cell (PSCell) may be the SCG cell in which the UE is instructed to perform random access when performing the SCG change procedure. "PSCell" may be also called as a Primary SCG Cell. In Dual Connectivity or MR-DC, two MAC entities may be configured in the UE: one for the MCG and one for the SCG. Each MAC entity may be configured by RRC with a serving cell supporting PUCCH transmission and contention based Random Access. In a MAC layer, the term Special Cell (SpCell) may refer to such cell, whereas the term SCell may refer to other serving cells. The term SpCell either may refer to the PCell of the MCG or the PSCell of the SCG depending on if the MAC entity is associated to the MCG or the SCG, respectively. A Timing Advance Group (TAG) containing the SpCell of a MAC entity may be referred to as primary TAG (pTAG), whereas the term secondary TAG (sTAG) refers to other TAGs.

DC may be further enhanced to support Multi-RAT Dual Connectivity (MR-DC). MR-DC may be a generalization of the Intra-E-UTRA Dual Connectivity (DC) described in 36.300, where a multiple Rx/Tx UE may be configured to utilize resources provided by two different nodes connected via non-ideal backhaul, one providing E-UTRA access and the other one providing NR access. One node acts as a Mater Node (MN) and the other as a Secondary Node (SN). The MN and SN are connected via a network interface and at least the MN is connected to the core network. In DC, a PSCell may be a primary secondary cell. In EN-DC, a PSCell may be a primary SCG cell or SpCell of a secondary cell group.

E-UTRAN may support MR-DC via E-UTRA-NR Dual Connectivity (EN-DC), in which a UE is connected to one eNB that acts as a MN and one en-gNB that acts as a SN. The en-gNB is a node providing NR user plane and control plane protocol terminations towards the UE, and acting as Secondary Node in EN-DC. The eNB is connected to the EPC via the S1 interface and to the en-gNB via the X2 interface. The en-gNB might also be connected to the EPC via the S1-U interface and other en-gNBs via the X2-U interface.

A timer is running once it is started, until it is stopped or until it expires; otherwise it is not running. A timer can be started if it is not running or restarted if it is running. A Timer may be always started or restarted from its initial value.

For NR, a technology of aggregating NR carriers may be studied. Both lower layer aggregation like Carrier Aggregation (CA) for LTE and upper layer aggregation like DC are investigated. From layer 2/3 point of view, aggregation of carriers with different numerologies may be supported in NR.

The main services and functions of the RRC sublayer may include the following:

Broadcast of System Information related to Access Stratum (AS) and Non Access Stratum (NAS);

Paging initiated by CN or RAN;

Establishment, maintenance and release of an RRC connection between the UE and NR RAN including:

Addition, modification and release of carrier aggregation;

Addition, modification and release of Dual Connectivity in NR or between LTE and NR;

Security functions including key management;

Establishment, configuration, maintenance and release of signaling radio bearers and data radio bearers;

Mobility functions including:

Handover;

UE cell selection and reselection and control of cell selection and reselection;

Context transfer at handover.

QoS management functions;

UE measurement reporting and control of the reporting;

NAS message transfer to/from NAS from/to UE.

Each MAC entity of a UE may be configured by RRC with a Discontinuous Reception (DRX) functionality that controls the UE's PDCCH monitoring activity for the MAC entity's C-RNTI (Radio Network Temporary Identifier), CS-RNTI, INT-RNTI, SFI-RNTI, SP-CSI-RNTI, TPC-PUCCH-RNTI, TPC-PUSCH-RNTI, and TPC-SRS-RNTI. For scheduling at cell level, the following identities are used:

C (Cell)-RNTI: unique UE identification used as an identifier of the RRC Connection and for scheduling;

CS (Configured Scheduling)-RNTI: unique UE identification used for Semi-Persistent Scheduling in the downlink;

INT-RNTI: identification of pre-emption in the downlink;

P-RNTI: identification of Paging and System Information change notification in the downlink;

SI-RNTI: identification of Broadcast and System Information in the downlink;

SP-CSI-RNTI: unique UE identification used for semi-persistent CSI reporting on PUSCH;

CI-RNTI: Cancellation Indication RNTI for Uplink.

For power and slot format control, the following identities are used:

SFI-RNTI: identification of slot format;

TPC-PUCCH-RNTI: unique UE identification to control the power of PUCCH;

TPC-PUSCH-RNTI: unique UE identification to control the power of PUSCH;

TPC-SRS-RNTI: unique UE identification to control the power of SRS;

During the random access procedure, the following identities are also used:

RA-RNTI: identification of the Random Access Response in the downlink;

Temporary C-RNTI: UE identification temporarily used for scheduling during the random access procedure;

Random value for contention resolution: UE identification temporarily used for contention resolution purposes during the random access procedure.

For NR connected to 5GC, the following UE identities are used at NG-RAN level:

I-RNTI: used to identify the UE context in RRC_INACTIVE.

The size of various fields in the time domain is expressed in time units $T_c=1/(\Delta f_{max} \times N_f)$ where $\Delta f_{max}=480 \times 10^3$ Hz and $N_f=4096$. The constant $\kappa=T_s/T_c=64$ where $T_s=1/(\Delta f_{ref} \cdot N_{f,ref})$, $\Delta f_{ref}=15 \cdot 10^3$ Hz and $N_{f,ref}=2048$.

Multiple OFDM numerologies are supported as given by Table 4.2-1 of [TS 38.211] where $\mu$ and the cyclic prefix for a bandwidth part are obtained from the higher-layer parameter subcarrierSpacing and cyclicPrefix, respectively.

The size of various fields in the time domain may be expressed as a number of time units $T_c=1/(15000 \times 2048)$ seconds. Downlink and uplink transmissions are organized into frames with $T_f=(\Delta f_{max} N_f/100) \cdot T_c=10$ ms duration, each consisting of ten subframes of $T_{sf}=(\Delta f_{max} N_f/1000) \cdot T_c=1$ ms duration. The number of consecutive OFDM symbols per subframe is $N_{symb}^{subframe,\mu}=N_{symb}^{slot} N_{slot}^{subframe,\mu}$. Each frame is divided into two equally-sized half-frames of five subframes each with half-frame 0 consisting of subframes 0-4 and half-frame 1 consisting of subframes 5-9.

For subcarrier spacing (SCS) configuration $\mu$, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. $N_{slot}^{subframe,\mu}$ is the number of slots per subframe for subcarrier spacing configuration $\mu$. There are $N_{symb}^{slot}$ consecutive OFDM symbols in a slot where $N_{symb}^{slot}$ depends on the cyclic prefix as given by Tables 4.3.2-1 and 4.3.2-2 of [TS 38.211]. The start of slot $n_s^\mu$ in a subframe is aligned in time with the start of OFDM symbol $n_s^\mu N_{symb}^{slot}$ the same subframe. Subcarrier spacing refers to a spacing (or frequency bandwidth) between two consecutive subcarrier in the frequency domain. For example, the subcarrier spacing can be set to 15 kHz (i.e. $\mu=0$), 30 kHz (i.e. $\mu=1$), 60 kHz (i.e. $\mu=2$), 120 kHz (i.e. $\mu=3$), or 240 kHz (i.e. $u=4$). A resource block is defined as a number of consecutive subcarriers (e.g. 12) in the frequency domain. For a carrier with different frequency, the applicable subcarrier may be different. For example, for a carrier in a frequency range 1, a subcarrier spacing only among a set of {15 kHz, 30 kHz, 60 kHz} is applicable. For a carrier in a frequency range 2, a subcarrier spacing only among a set of {60 kHz, 120 kHz, 240 kHz} is applicable. The base station may not configure an inapplicable subcarrier spacing for a carrier.

OFDM symbols in a slot can be classified as 'downlink', 'flexible', or 'uplink'. Signaling of slot formats is described in subclause 11.1 of [TS 38.213].

In a slot in a downlink frame, the UE may assume that downlink transmissions only occur in 'downlink' or 'flexible' symbols. In a slot in an uplink frame, the UE may only transmit in 'uplink' or 'flexible' symbols.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more base stations 160 (e.g., eNB, gNB) and one or more user equipments (UEs) 102 in which systems and methods for PUCCH transmission with or without frequency hopping may be implemented. The one or more UEs 102 may communicate with one or more base stations 160 using one or more antennas 122a-n. For example, a UE 102 transmits electromagnetic signals to the base station 160 and receives electromagnetic signals from the base station 160 using the one or more antennas 122a-n. The base station 160 communicates with the UE 102 using one or more antennas 180a-n.

It should be noted that in some configurations, one or more of the UEs 102 described herein may be implemented in a single device. For example, multiple UEs 102 may be combined into a single device in some implementations. Additionally or alternatively, in some configurations, one or more of the base stations 160 described herein may be implemented in a single device. For example, multiple base stations 160 may be combined into a single device in some implementations. In the context of FIG. 1, for instance, a single device may include one or more UEs 102 in accordance with the systems and methods described herein. Additionally or alternatively, one or more base stations 160 in accordance with the systems and methods described herein may be implemented as a single device or multiple devices.

The UE 102 and the base station 160 may use one or more channels 119, 121 to communicate with each other. For example, a UE 102 may transmit information or data to the base station 160 using one or more uplink (UL) channels 121 and signals. Examples of uplink channels 121 include a physical uplink control channel (PUCCH) and a physical uplink shared channel (PUSCH), etc. Examples of uplink signals include a demodulation reference signal (DMRS) and a sounding reference signal (SRS), etc. The one or more base stations 160 may also transmit information or data to the one or more UEs 102 using one or more downlink (DL) channels 119 and signals, for instance. Examples of downlink channels 119 include a PDCCH, a PDSCH, etc. A PDCCH can be used to schedule DL transmissions on PDSCH and UL transmissions on PUSCH, where the Downlink Control Information (DCI) on PDCCH includes downlink assignment and uplink scheduling grants. The PDCCH is used for transmitting Downlink Control Information (DCI) in a case of downlink radio communication (radio communication from the base station to the UE). Here, one or more DCIs (may be referred to as DCI formats) are defined for transmission of downlink control information. Information bits are mapped to one or more fields defined in a DCI format. Examples of downlink signals include a primary synchronization signal (PSS), a secondary synchronization signal (SSS), a cell-specific reference signal (CRS), a non-zero power channel state information reference signal (NZP CSI-RS), and a zero power channel state information reference signal (ZP CSI-RS), etc. Other kinds of channels or signals may be used.

Each of the one or more UEs 102 may include one or more transceivers 118, one or more demodulators 114, one or more decoders 108, one or more encoders 150, one or more modulators 154, one or more data buffers 104 and one or more UE operations modules 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals (e.g., downlink channels, downlink signals) from the base station 160 using one or more antennas 122a-n. For example, the receiver 120 may receive and downconvert signals to produce one or more received signals 116. The one or more received signals 116 may be provided to a demodulator 114. The one or more transmitters 158 may transmit signals (e.g., uplink channels, uplink signals) to the base station 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more base stations 160. The UE operations module 124 may include a UE RRC information configuration module 126. The UE operations module 124 may include a UE resource management (RM) control module 128. In some implementations, the UE operations module 124 may include physical (PHY) entities, Medium Access Control (MAC) entities, Radio Link Control (RLC) entities, packet data convergence protocol (PDCP) entities, and an Radio Resource Control (RRC) entity. For example, the UE RRC information configuration module 126 may process RRC parameter for random access configurations, initial UL BWP configuration, maximum bandwidth the UE can support, and cell specific PUCCH resource configuration(s). The UE RA control module (processing module) 128 may determine to select a SS/PBCH block for random access based on the measured RSRP value from the UE receiver 178. The UE RM control module 128 may determine a PRACH occasion and a preamble for PRACH transmission based on the processing output from the UE RRC information configuration module 126.

The UE RM control module 128 may determine whether or not to transmit a PUCCH transmission suing frequency hopping bases on one or more factors, for example, a DCI field included in a DCI format scheduling a PDSCH, RRC parameters, and a predefined rule. The RRC parameters and/or the predefined rule are given based on the processing output from the UE RRC information configuration module 126. The UE RM control module 128 may determine a cell specific PUCCH resource set for transmission of HARQ-ACK information on a PUCCH.

The UE RM control module 128 may determine whether a PRB index of the PUCCH transmission is determined based on a size of the initial UL BWP or not based on a size of the initial UL BWP is determined based on a RRC parameter which is a processing output from the UE RRC information configuration module 126.

The UE operations module 124 may provide information 148 to the one or more receivers 120. For example, the UE operations module 124 may inform the receiver(s) 120 when or when not to receive transmissions based on the Radio Resource Control (RRC) message (e.g, broadcasted system information, RRC reconfiguration message), MAC control element, and/or the DCI (Downlink Control Information). The UE operations module 124 may provide information 148, including the PDCCH monitoring occasions and DCI format size, to the one or more receivers 120. The UE operation module 124 may inform the receiver(s) 120 when or where to receive/monitor the PDCCH candidate for DCI formats with which DCI size.

The UE operations module 124 may provide information 138 to the demodulator 114. For example, the UE operations module 124 may inform the demodulator 114 of a modulation pattern anticipated for transmissions from the base station 160.

The UE operations module 124 may provide information 136 to the decoder 108. For example, the UE operations module 124 may inform the decoder 108 of an anticipated encoding for transmissions from the base station 160. For example, the UE operations module 124 may inform the decoder 108 of an anticipated PDCCH candidate encoding with which DCI size for transmissions from the base station 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the base station 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the base station 160. The one or more transmitters 158 may upconvert and transmit the modulated signal(s) 156 to one or more base stations 160.

The base station 160 may include one or more transceivers 176, one or more demodulators 172, one or more decoders 166, one or more encoders 109, one or more modulators 113, one or more data buffers 162 and one or more base station operations modules 182. For example, one or more reception and/or transmission paths may be implemented in a base station 160. For convenience, only a single transceiver 176, decoder 166, demodulator 172, encoder 109 and modulator 113 are illustrated in the base station 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals (e.g., uplink channels, uplink signals) from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals (e.g., downlink channels, downlink signals) to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The base station 160 may use the decoder 166 to decode signals. The decoder 166 may produce one or more decoded signals 164, 168. For example, a first base station-decoded signal 164 may comprise received payload data, which may be stored in a data buffer 162. A second base station-decoded signal 168 may comprise overhead data and/or control data. For example, the second base station-decoded signal 168 may provide data (e.g., PUSCH transmission data) that may be used by the base station operations module 182 to perform one or more operations.

In general, the base station operations module 182 may enable the base station 160 to communicate with the one or more UEs 102. The base station operations module 182 may include a base station RRC information configuration module 194. The base station operations module 182 may include a base station resource management (RM) control module 196 (or a base station RM processing module 196). The base station operations module 182 may include PHY entities, MAC entities, RLC entities, PDCP entities, and an RRC entity.

The base station RM control module 196 may determine, for respective UE, when and where to transmit the preamble, the time and frequency resource of PRACH occasions and input the information to the base station RRC information configuration module 194. The base station RM control module 196 may generate a RAR UL grant to schedule a PUSCH with or without frequency hopping. The base station RM control module 196 may generate a DCI format to schedule a PDSCH. The base station RM control module

196 may determine whether or not to receive a PUCCH transmission suing frequency hopping bases on one or more factors. The base station RM control module 196 may determine an indication of PUCCH frequency hopping which is used to indicate the UE 102 whether to perform a PUCCH transmission using frequency hopping or without frequency hopping. The base station RM control module 196 may generate a DCI field based on the indication to be included in a DCI format scheduling a PDSCH. Additionally or alternatively, the base station RM control module 196 may input the information of indication to the base station RRC information configuration module 194. The base station RRC information configuration module 194 may generate RRC parameter(s) related to the indication and the RRC parameter(s) included in the broadcasted system information.

The base station RM control module 196 may determine information to indicate whether a PRB index of a PUCCH transmission is determined based on a size of the initial UL BWP or not based on a size of the initial UL BWP. The base station RM control module 196 may input the information to the base station RRC information configuration module 194. The base station RRC information configuration module 194 may generate RRC parameter included in the broadcasted system information to indicate UE whether a PRB index of the PUCCH transmission is determined based on a size of the initial UL BWP or not based on a size of the initial UL BWP is determined based on the RRC parameter.

The base station RM control module 196 may determine the configuration of a cell specific PUCCH resource set and input the information to the base station RRC information configuration module 194. The base station RRC information configuration module 194 may generate a first RRC parameter providing the cell specific PUCCH resource set.

The base station operations module 182 may provide the benefit of performing PDCCH candidate search and monitoring efficiently. The base station operations module 182 may provide information 190 to the one or more receivers 178. For example, the base station operations module 182 may inform the receiver(s) 178 when or when not to receive transmissions based on the RRC message (e.g, broadcasted system information, RRC reconfiguration message), MAC control element, and/or the DCI (Downlink Control Information).

The base station operations module 182 may provide information 188 to the demodulator 172. For example, the base station operations module 182 may inform the demodulator 172 of a modulation pattern anticipated for transmissions from the UE(s) 102.

The base station operations module 182 may provide information 186 to the decoder 166. For example, the base station operations module 182 may inform the decoder 166 of an anticipated encoding for transmissions from the UE(s) 102.

The base station operations module 182 may provide information 101 to the encoder 109. The information 101' may include data to be encoded and/or instructions for encoding. For example, the base station operations module 182 may instruct the encoder 109 to encode transmission data 105 and/or other information 101.

In general, the base station operations module 182 may enable the base station 160 to communicate with one or more network nodes (e.g., a NG mobility management function, a NG core UP function, a mobility management entity (MME), serving gateway (S-GW), gNBs). The base station operations module 182 may also generate a RRC reconfiguration message to be signaled to the UE 102.

The encoder 109 may encode transmission data 105 and/or other information 101 provided by the base station operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The base station operations module 182 may provide information 103 to the modulator 113. This information 103 may include instructions for the modulator 113. For example, the base station operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The base station operations module 182 may provide information 192 to the one or more transmitters 117. This information 192 may include instructions for the one or more transmitters 117. For example, the base station operations module 182 may instruct the one or more transmitters 117 when to (or when not to) transmit a signal to the UE(s) 102. The base station operations module 182 may provide information 192, including the PDCCH monitoring occasions and DCI format size, to the one or more transmitters 117. The base station operation module 182 may inform the transmitter(s) 117 when or where to transmit the PDCCH candidate for DCI formats with which DCI size. The one or more transmitters 117 may upconvert and transmit the modulated signal(s) 115 to one or more UEs 102.

It should be noted that one or more of the elements or parts thereof included in the base station(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

A base station may generate a RRC message including the one or more RRC parameters, and transmit the RRC message to a UE. A UE may receive, from a base station, a RRC message including one or more RRC parameters. The term 'RRC parameter(s)' in the present disclosure may be alternatively referred to as 'RRC information element(s)'. A RRC parameter may further include one or more RRC parameter(s). In the present disclosure, a RRC message may include system information. a RRC message may include one or more RRC parameters. A RRC message may be sent on a broadcast control channel (BCCH) logical channel, a common control channel (CCCH) logical channel or a dedicated control channel (DCCH) logical channel.

In the present disclosure, a description 'a base station may configure a UE to' may also imply/refer to 'a base station may transmit, to a UE, an RRC message including one or more RRC parameters'. Additionally or alternatively, 'RRC parameter configure a UE to' may also refer to 'a base station may transmit, to a UE, an RRC message including one or more RRC parameters'. Additionally or alternatively, 'a UE is configured to' may also refer to 'a UE may receive, from a base station, an RRC message including one or more RRC parameters'.

Figure 2:
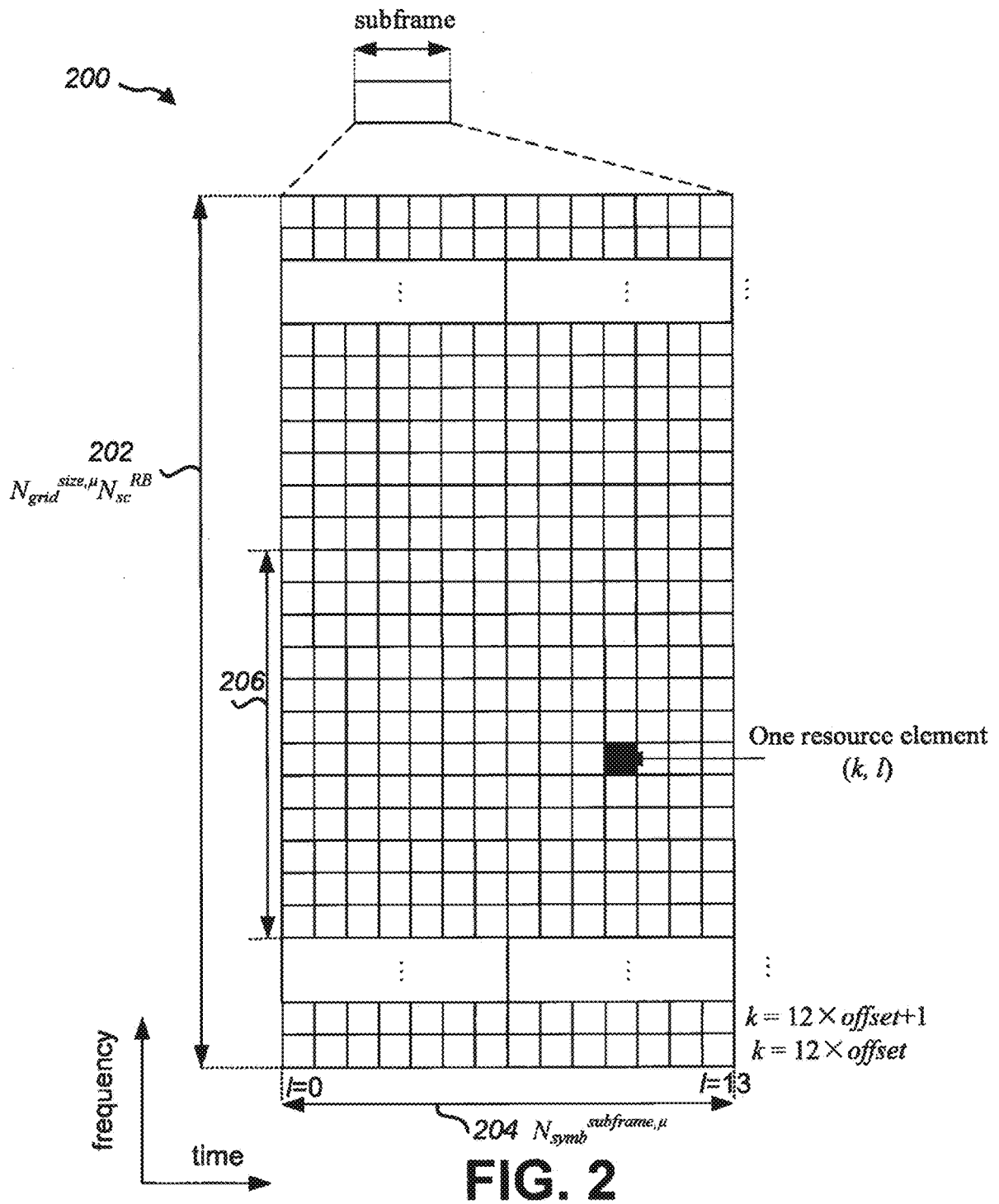
FIG. 2 is a diagram illustrating one example 200 of a resource grid.

FIG. 2 is a diagram illustrating one example of a resource grid 200.

For each numerology and carrier, a resource grid of $N_{grid,x}^{size,\mu} N_{sc}^{RB}$ subcarriers and $N_{symb}^{subframe,\mu}$ OFDM symbols is defined, starting at common resource block $N_{grid}^{start,\mu}$ indicated by higher layer signaling. There is one set of resource grids per transmission direction (uplink or downlink) with the subscript x set to DL and UL for downlink and uplink, respectively. There is one resource grid for a given antenna port p, subcarrier spacing configuration μ, and the transmission direction (downlink or uplink). When there is no risk for confusion, the subscript x may be dropped.

In the FIG. 2, the resource gird 200 includes the $N_{grid,x}^{size,\mu} N_{sc}^{RB}$ (202) subcarriers in the frequency domain and includes $N_{symb}^{subframe,\mu}$ (204) symbols in the time domain. In the FIG. 2, as an example for illustration, the subcarrier spacing configuration μ is set to 0. That is, in the FIG. 2, the number of consecutive OFDM symbols $N_{symb}^{subframe,\mu}$ (204) per subframe is equal to 14.

The carrier bandwidth $N_{grid}^{size,\mu}$ ($N_{grid,x}^{size,\mu}$) for subcarrier spacing configuration μ is given by the higher-layer (RRC) parameter carrierBandwidth in the SCS-SpecificCarrier IE. The starting position $N_{grid}^{start,\mu}$ for subcarrier spacing configuration μ is given by the higher-layer parameter offsetToCarrier in the SCS-SpecificCarrier IE. The frequency location of a subcarrier refers to the center frequency of that subcarrier.

In the FIG. 2, for example, a value of offset is provided by the higher-layer parameter offsetToCarrier That is, k=12× offset is the lowest usable subcarrier on this carrier.

Each element in the resource grid for antenna port p and subcarrier spacing configuration μ is called a resource element and is uniquely identified by $(k, 1)_{p,\mu}$ where k is the index in the frequency domain and 1 refers to the symbols position in the time domain relative to same reference point. The resource element consists of one subcarrier during one OFDM symbol.

A resource block is defined as $N_{sc}^{RB}=12$ consecutive subcarriers in the frequency domain. As shown in the FIG. 2, a resource block 206 includes 12 consecutive subcarriers in the frequency domain. Resource block can be classified as common resource block (CRB) and physical resource block (PRB).

Common resource blocks are numbered from 0 and upwards in the frequency domain for subcarrier spacing configuration μ. The center of subcarrier 0 of common resource block with index 0 (i.e. CRB0) for subcarrier spacing configuration μ coincides with point A. The relation between the common resource block number $n_{CRB}^{\mu}$ in the frequency domain and resource element (k, 1) for subcarrier spacing configuration μ is given by Formula (1) $n_{CRB}^{\mu}$=floor $(k/N_{sc}^{RB})$ where k is defined relative to the point A such that k=0 corresponds to the subcarrier centered around the point A. The function floor(A) hereinafter is to output a maximum integer not larger than the A.

Point A refers to as a common reference point. Point A coincides with subcarrier 0 (i.e. k=0) of a CRB 0 for all subcarrier spacing. Point A can be obtained from a RRC parameter offsetToPointA or a RRC parameter absoluteFrequencyPointA. The RRC parameter offsetToPointA is used for a PCell downlink and represents the frequency offset between point A and the lowest subcarrier of the lowest resource block, which has the subcarrier spacing provided by a higher-layer parameter subCarrierSpacingCommon and overlaps with the SS/PBCH block used by the UE for initial cell selection, expressed in units of resource blocks assuming 15 kHz subcarrier spacing for frequency range (FR) 1 and 60 kHz subcarrier spacing for frequency range (FR2). FR1 corresponds to a frequency range between 410 MHz and 7125 MHz. FR2 corresponds to a frequency range between 24250 MHz and 52600 MHz. The RRC parameter absoluteFrequencyPointA is used for all cased other than the PCell case and represents the frequency-location of point A expressed as in ARFCN. The frequency location of point A can be the lowest subcarrier of the carrier bandwidth (or the actual carrier). Additionally, point A may be located outside the carrier bandwidth (or the actual carrier).

As above mentioned, the information element (IE) SCS-SpecificCarrier provides parameters determining the location and width of the carrier bandwidth or the actual carrier. That is, a carrier (or a carrier bandwidth, or an actual carrier) is determined (identified, or defined) at least by a RRC parameter offsetToCarrier, a RRC parameter subcarrier-Spacing, and a RRC parameter carrierBandwidth in the SCS-SpecificCarrier IE.

The subcarrierSpacing indicates (or defines) a subcarrier spacing of the carrier. The offsetToCarrier indicates an offset in frequency domain between point A and a lowest usable subcarrier on this carrier in number of resource blocks (e.g. CRBs) using the subcarrier spacing defined for the carrier. The carrierBandwidth indicates width of this carrier in number of resource blocks (e.g. CRBs or PRBs) using the subcarrier spacing defined for the carrier. A carrier includes at most 275 resource blocks.

Physical resource block for subcarrier spacing configuration $\mu$ are defined within a bandwidth part and numbered form 0 to $N_{BWP,i}^{size,\mu}$ where i is the number of the bandwidth part. The relation between the physical resource block $n_{PRB}^{\mu}$ in bandwidth part (BWP) i and the common resource block $n_{CRB}^{\mu}$ is given by Formula (2) $n_{CRB}^{\mu}=n_{PRB}^{\mu}+N_{BWP,i}^{start,\mu}$ where $N_{BWP,i}^{start,\mu}$ is the common resource block where bandwidth part i starts relative to common resource block 0 (CRB0). When there is no risk for confusion the index p may be dropped.

A BWP is a subset of contiguous common resource block for a given subcarrier spacing configuration $\mu$ on a given carrier. To be specific, a BWP can be identified (or defined) at least by a subcarrier spacing $\mu$ indicated by the RRC parameter subcarrierSpacing, a cyclic prefix determined by the RRC parameter cyclicPrefix, a frequency domain location, a bandwidth, an BWP index indicated by bwp-Id and so on. The locationAndBandwidth can be used to indicate the frequency domain location and bandwidth of a BWP. The value indicated by the locationAndBandwidth is interpreted as resource indicator value (RIV) corresponding to an offset (an starting resource block) $RB_{start}$ and a length $L_{RB}$ in terms of contiguously resource blocks. The offset $RB_{start}$ is a number of CRBs between the lowest CRB of the carrier and the lowest CRB of the BWP. The $N_{BWP,i}^{start,\mu}$ is given as Formula (3) $N_{BWP,i}^{start,\mu}=O_{carrier}+RB_{start}$. The value of $O_{carrier}$ is provided by offsetTocarrier for the corresponding subcarrier spacing configuration $\mu$.

A UE 102 configured to operation in BWPs of a serving cell, is configured by higher layers for the serving cell a set of at most four BWPs in the downlink for reception. At a given time, a single downlink BWP is active. The bases station 160 may not transmit, to the UE 102, PDSCH and/or PDCCH outside the active downlink BWP. A UE 102 configured to operation in BWPs of a serving cell, is configured by higher layers for the serving cell a set of at most four BWPs for transmission. At a given time, a single uplink BWP is active. The UE 102 may not transmit, to the base station 160, PUSCH or PUCCH outside the active BWP. The specific signaling (higher layers signaling) for BWP configurations are described later.

Figure 3:
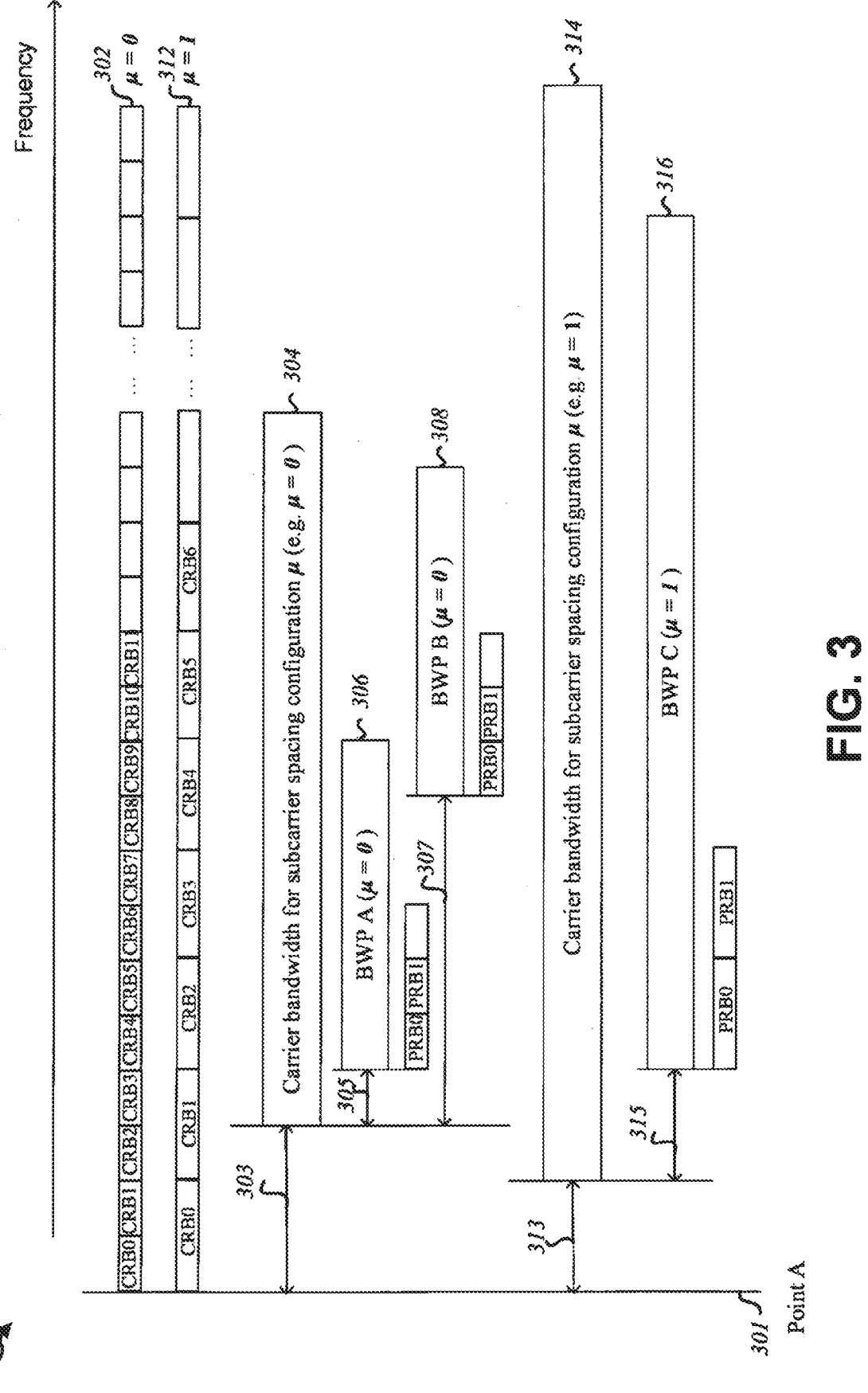
FIG. 3 is a diagram illustrating one example 300 of common resource block grid, carrier configuration and BWP configuration by a UE 102 and a base station 160.

FIG. 3 is a diagram illustrating one example 300 of common resource block grid, carrier configuration and BWP configuration by a UE 102 and a base station 160.

Point A 301 is a lowest subcarrier of a CRB0 for all subcarrier spacing configurations. The CRB grid 302 and the CRB grid 312 are corresponding to two different subcarrier spacing configurations. The CRB grid 302 is for subcarrier spacing configuration $\mu$=0 (i.e. the subcarrier spacing with 15 kHz). The CRB grid 312 is for subcarrier spacing configuration $\mu$=1 (i.e. the subcarrier spacing with 30 kHz).

One or more carrier are determined by respective SCS-SpecificCarrier IEs, respectively. In the FIG. 3, the carrier 304 uses the subcarrier spacing configuration $\mu$=0. And the carrier 314 uses the subcarrier spacing configuration $\mu$=1. The starting position $N_{grid}^{start,\mu}$ of the carrier 304 is given based on the value of an offset 303 (i.e. $O_{carrier}$) indicated by an offsetToCarrier in an SCS-SpecificCarrier IE. As shown in the FIG. 3, for example, the offsetToCarrier indicates the value of the offset 303 as $O_{carrier}$=3. That is, the starting position $N_{grid}^{start,\mu}$ of the carrier 304 corresponds to the CRB3 of the CRB grid 302 for subcarrier spacing configuration $\mu$=0. In the meantime, the starting position $N_{grid}^{start,\mu}$ of the carrier 314 is given based on the value of an offset 313 (i.e. $O_{carrier}$) indicated by an offsetToCarrier in another SCS-SpecificCarrier IE. For example, the offsetToCarrier indicates the value of the offset 313 as $O_{carrier}$=1. That is, the starting position $N_{grid}^{start,\mu}$ of the carrier 314 corresponds to the CRB1 of the CRB grid 312 for subcarrier spacing configuration $\mu$=1. A carrier using different subcarrier spacing configurations can occupy different frequency ranges.

As above-mentioned, a BWP is for a given subcarrier spacing configuration $\mu$. One or more BWPs can be configured for a same subcarrier spacing configuration $\mu$. For example, in the FIG. 3, the BWP 306 is identified at least by the $\mu$=0, a frequency domain location, a bandwidth ($L_{RB}$), and an BWP index (index A). The first PRB (i.e. PRB0) of a BWP is determined at least by the subcarrier spacing of the BWP, an offset derived by the locationAndBandwidth and an offset indicated by the offsetToCarrier corresponding to the subcarrier spacing of the BWP. An offset 305 ($RB_{start}$) is derived as 1 by the locationAndBandwidth. According to the Formulas (2) and (3), the PRB0 of BWP 306 corresponds to CRB 4 of the CRB grid 302, and the PRB1 of BWP 306 corresponds to CRB 5 of the CRB grid 302, and so on.

Additionally, in the FIG. 3, the BWP 308 is identified at least by the $\mu$=0, a frequency domain location, a bandwidth ($L_{RB}$), and an BWP index (index B). For example, an offset 307 ($RB_{start}$) is derived as 6 by the locationAndBandwidth. According to the Formulas (2) and (3), the PRB0 of BWP 308 corresponds to CRB 9 of the CRB grid 302, and the PRB1 of BWP 308 corresponds to CRB 10 of the CRB grid 302, and so on.

Additionally, in the FIG. 3, the BWP 316 is identified at least by the $\mu$=1, a frequency domain location, a bandwidth ($L_{RB}$), and an BWP index (index C). For example, an offset 315 ($RB_{start}$) is derived as 1 by the locationAndBandwidth. According to the Formulas (2) and (3), the PRB0 of BWP 316 corresponds to CRB 2 of the CRB grid 312, and the PRB1 of BWP 316 corresponds to CRB 3 of the CRB grid 312, and so on.

As shown in the FIG. 3, a carrier with the defined subcarrier spacing locate in a corresponding CRB grid with the same subcarrier spacing. A BWP with the defined subcarrier spacing locate in a corresponding CRB grid with the same subcarrier spacing as well.

A base station may transmit a RRC message including one or more RRC parameters related to BWP configuration to a UE. A UE may receive the RRC message including one or more RRC parameters related to BWP configuration from a base station. For each cell, the base station may configure at least an initial DL BWP and one initial uplink bandwidth parts (initial UL BWP) to the UE. Furthermore, the base station may configure additional UL and DL BWPs to the UE for a cell.

A RRC parameters initialDownlinkBWP may indicate the initial downlink BWP (initial DL BWP) configuration for a serving cell (e.g., a SpCell and Scell). The base station may configure the RRC parameter locationAndBandwidth included in the initialDownlinkBWP so that the initial DL BWP contains the entire CORESET 0 of this serving cell in the frequency domain. The locationAndBandwidth may be used to indicate the frequency domain location and bandwidth of a BWP. A RRC parameters initialUplinkBWP may indicate the initial uplink BWP (initial UL BWP) configuration for a serving cell (e.g., a SpCell and Scell). The base station may transmit initialDownlinkBWP and/or initialUplinkBWP which may be included in SIB1, RRC parameter ServingCellConfigCommon, or RRC parameter ServingCellConfig to the UE.

SIB1, which is a cell-specific system information block (SystemInformationBlock, SIB), may contain information relevant when evaluating if a UE is allowed to access a cell and define the scheduling of other system information. SIB1 may also contain radio resource configuration information that is common for all UEs and barring information applied to the unified access control. The RRC parameter ServingCellConfigCommon is used to configure cell specific parameters of a UE's serving cell. The RRC parameter ServingCellConfig is used to configure (add or modify) the UE with a serving cell, which may be the SpCell or an SCell of an MCS or SCG. The RRC parameter ServingCellConfig herein are mostly UE specific but partly also cell specific.

The base station may configure the UE with a RRC parameter BWP-Downlink and a RRC parameter BWP-Uplink. The RRC parameter BWP-Downlink can be used to configure an additional DL BWP. The RRC parameter BWP-Uplink can be used to configure an additional UL BWP. The base station may transmit the BWP-Downlink and the BWP-Uplink which may be included in RRC parameter ServingCellConfig to the UE.

If a UE is not configured (provided) initialDownlinkBWP from a base station, an initial DL BWP is defined by a location and number of contiguous physical resource blocks (PRBs), starting from a PRB with the lowest index and ending at a PRB with the highest index among PRBs of a CORESET for Type0-PDCCH CSS set (i.e. CORESET 0), and a subcarrier spacing (SCS) and a cyclic prefix for PDCCH reception in the CORESET for Type0-PDCCH CSS set. If a UE is configured (provided) initialDownlinkBWP from a base station, the initial DL BWP is provided by initialDownlinkBWP. If a UE is configured (provided) initialUplinkBWP from a base station, the initial UL BWP is provided by initialUplinkBWP.

The UE may be configured by the based station, at least one initial BWP and up to 4 additional BWP(s). One of the initial BWP and the configured additional BWP(s) may be activated as an active BWP. The UE may monitor DCI format, and/or receive PDSCH in the active DL BWP. The UE may not monitor DCI format, and/or receive PDSCH in a DL BWP other than the active DL BWP. The UE may transmit PUSCH and/or PUCCH in the active UL BWP. The UE may not transmit PUSCH and/or PUCCH in a BWP other than the active UL BWP.

As above-mentioned, a UE may monitor DCI format in the active DL BWP. To be more specific, a UE may monitor a set of PDCCH candidates in one or more CORESETs on the active DL BWP on each activated serving cell configured with PDCCH monitoring according to corresponding search space set where monitoring implies decoding each PDCCH candidate according to the monitored DCI formats.

A set of PDCCH candidates for a UE to monitor is defined in terms of PDCCH search space sets. A search space set can be a CSS set or a USS set. A UE may monitor a set of PDCCH candidates in one or more of the following search space sets a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG a Type0A-PDCCH CSS set configured by searchSpaceOtherSystemInformation in PDCCH-ConfigCommon for a DCI format with CRC scrambled by a SI-RNTI on the primary cell of the MCG a Type1-PDCCH CSS set configured by ra-SearchSpace in PDCCH-ConfigCommon for a DCI format with CRC scrambled by a RA-RNTI or a TC-RNTI on the primary cell a Type2-PDCCH CSS set configured by pagingSearchSpace in PDCCH-ConfigCommon for a DCI format with CRC scrambled by a P-RNTI on the primary cell of the MCG a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, or TPC-SRS-RNTI and, only for the primary cell, C-RNTI, MCS-C-RNTI, or CS-RNTI(s), and a USS set configured by SearchSpace in PDCCH-Config with searchSpaceType=ue-Specific for DCI formats with CRC scrambled by C-RNTI, MCS-C-RNTI, SP-CSI-RNTI, or CS-RNTI(s).

For a DL BWP, if a UE is configured (provided) one above-described search space set, the UE may determine PDCCH monitoring occasions for a set of PDCCH candidates of the configured search space set. PDCCH monitoring occasions for monitoring PDCCH candidates of a search space set s is determined according to the search space set s configuration and a CORESET configuration associated with the search space set s. In other words, a UE may monitor a set of PDCCH candidates of the search space set in the determined (configured) PDCCH monitoring occasions in one or more configured control resource sets (CORESETs) according to the corresponding search space set configurations and CORESET configuration. A base station may transmit, to a UE, information to specify one or more CORESET configuration and/or search space configuration. The information may be included in MIB and/or SIBs broadcasted by the base station. The information may be included in RRC configurations or RRC parameters. A base station may broadcast system information such as MIB, SIBs to indicate CORESET configuration or search space configuration to a UE. Or the base station may transmit a RRC message including one or more RRC parameters related to CORESET configuration and/or search space configuration to a UE.

An illustration of search space set configuration is described below.

A base station may transmit a RRC message including one or more RRC parameters related to search space configuration. A base station may determine one or more RRC parameter(s) related to search space configuration for a UE. A UE may receive, from a base station, a RRC message including one or more RRC parameters related to search space configuration. RRC parameter(s) related to search space configuration (e.g. SearchSpace, searchSpaceZero) defines how and where to search for PDCCH candidates. 'search/monitor for PDCCH candidate for a DCI format' may also refer to 'monitor/search for a DCI format' for short.

For example, a RRC parameter searchSpaceZero is used to configure a common search space 0 of an initial DL BWP. The searchSpaceZero corresponds to 4 bits. The base station may transmit the searchSpaceZero via PBCH(MIB) or ServingCell.

Additionally, a RRC parameter SearchSpace is used to define how/where to search for PDCCH candidates. The RRC parameters search space may include a plurality of RRC parameters as like, searchSpaceId, controlResourceSetId, monitoringSlotPeriodicityAndOffset, duration, monitoringSymbolsWithinSlot, nrofCandidates, searchSpaceType. Some of the above-mentioned RRC parameters may be present or absent in the RRC parameters SearchSpace. Namely, the RRC parameter SearchSpace may include all the above-mentioned RRC parameters. Namely, the RRC parameter SearchSpace may include one or more of the above-mentioned RRC parameters. If some of the parameters are absent in the RRC parameter SearchSpace, the UE 102 may apply a default value for each of those parameters.

Herein, the RRC parameter searchSpaceId is an identity or an index of a search space. The RRC parameter searchSpaceId is used to identify a search space. Or rather, the RRC parameter serchSpaceId provide a search space set index s, 0<=s<40. Then a search space s hereinafter may refer to a search space identified by index s indicated by RRC parameter searchSpaceId. The RRC parameter controlResourceSetId concerns an identity of a CORESET, used to identify a CORESET. The RRC parameter controlResourceSetId indicates an association between the search space s and the CORESET identified by controlResourceSetId. The RRC parameter controlResourceSetId indicates a CORESET applicable for the search space. CORESET p hereinafter may refer to a CORESET identified by index p indicated by RRC parameter controlResourceSetId. Each search space is associated with one CORESET. The RRC parameter monitoringSlotPeriodicityAndOffset is used to indicate slots for PDCCH monitoring configured as periodicity and offset. Specifically, the RRC parameter monitoringSlotPeriodicityAndOffset indicates a PDCCH monitoring periodicity of $k_s$ slots and a PDCCH monitoring offset of $o_s$ slots. A UE can determine which slot is configured for PDCCH monitoring according to the RRC parameter monitoringSlotPeriodicityAndOffset. The RRC parameter monitoringSymbolsWithinSlot is used to indicate a first symbol(s) for PDCCH monitoring in the slots configured for PDCCH monitoring. That is, the parameter monitoringSymbolsWithinSlot provides a PDCCH monitoring pattern within a slot, indicating first symbol(s) of the CORESET within a slot (configured slot) for PDCCH monitoring. The RRC parameter duration indicates a number of consecutive slots $T_s$ that the search space lasts (or exists) in every occasion (PDCCH occasion, PDCCH monitoring occasion).

The RRC parameter may include aggregationLevel1, aggregationLevel2, aggregationLevel4, aggregationLevel8, aggregationLevel16. The RRC parameter nrofCandidates may provide a number of PDCCH candidates per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, for CCE aggregation level 8, and CCE aggregation level 16, respectively. In other words, the value L can be set to either one in the set {1, 2, 4, 8, 16}. The number of PDCCH candidates per CCE aggregation level L can be configured as 0, 1, 2, 3, 4, 5, 6, or 8. For example, in a case the number of PDCCH candidates per CCE aggregation level L is configured as 0, the UE may not search for PDCCH candidates for CCE aggregation L. That is, in this case, the UE may not monitor PDCCH candidates for CCE aggregation L of a search space set s. For example, the number of PDCCH candidates per CCE aggregation level L is configured as 4, the UE may monitor 4 PDCCH candidates for CCE aggregation level L of a search space set s.

The RRC parameter searchSpaceType is used to indicate that the search space set s is either a CSS set or a USS set. The RRC parameter searchSpaceType may include either a common or a ue-Specific. The RRC parameter common configure the search space set s as a CSS set and DCI format to monitor. The RRC parameter ue-Specific configures the search space set s as a USS set. The RRC parameter ue-Specific may include dci-Formats. The RRC parameter dci-Formats indicates to monitor PDCCH candidates either for DCI format 0_0 and DCI format 1_0, or for DCI format 0_1 and DCI format 1_1 in search space set s. That is, the RRC parameter searchSpaceType indicates whether the search space set s is a CSS set or a USS set as well as DCI formats to monitor for. The RRC parameter ue-Specific may further include a new RRC parameter (e.g. dci-FormatsExt) in addition to the dci-Formats. The RRC parameter dci-FormatsExt indicates to monitor PDCCH candidates for DCI format 0_2 and DCI format 1_2, or for DCI format 0_1, DCI format 1_1, DCI format 0_2 and DCI format 1_2. If the RRC parameter dci-FormatsExt is included in the RRC parameter ue-Specific, the UE may ignore the RRC parameter dci-Formats. That is to say, the UE may not monitor the PDCCH candidates for DCI formats indicated by the RRC parameter dci-Format, and may monitor the PDCCH candidates for DCI formats indicated by the RRC parameter dci-FormatsExt.

The UE 102 may monitor PDCCH candidates for DCI format 0_0 and/or DCI format 1_0 in either a CSS or a USS. The UE 102 may monitor PDCCH candidates for DCI format 0_1, DCI format 1_1, DCI format 0_2 and/or DCI format 12 only in a USS but cannot monitor PDCCH candidates for DCI format 0_1, DCI format 1_1, DCI format 0_2, and/or DCI format 1_2 in a CSS. The DCI format 01 may schedule up to two transport blocks for one PUSCH while the DCI format 0_2 may only schedule one transport blocks for one PUSCH. DCI format 0_2 may not consist of some fields (e.g. 'CBG transmission information' field), which may be present in DCI format 0_1. Similarly, the DCI format 1_1 may schedule up to two transport blocks for one PDSCH while the DCI format 12 may only schedule one transport blocks for one PDSCH. DCI format 1_2 may not consist of some fields (e.g., 'CBG transmission information' field), which may be present in DCI format 1_1. The DCI format 1_2 and DCI format 1_1 may consist of one or more same DCI fields (e.g., 'antenna port' field).

The base station 160 may schedule a UE 102 to receive PDSCH by a downlink control information (DCI). A DCI format provides DCI and includes one or more DCI fields. The one or more DCI fields in a DCI format are mapped to the information bits. As above-mentioned, the UE 102 can be configured by the base station 160 one or more search space sets to monitor PDCCH for detecting corresponding DCI formats. If the UE 102 detects a DCI format (e.g., the DCI format 1_0, the DCI format 1_1, or the DCI format 1_2) in a PDCCH, the UE 102 may be scheduled by the DCI format to receive a PDSCH.

A USS at CCE aggregation level L is defined by a set of PDCCH candidates for CCE aggregation L. A USS set may be constructed by a plurality of USS corresponding to respective CCE aggregation level L. A USS set may include one or more USS(s) corresponding to respective CCE aggregation level L. A CSS at CCE aggregation level L is defined by a set of PDCCH candidates for CCE aggregation L. A CSS set may be constructed by a plurality of USS corresponding to respective CCE aggregation level L. A CSS set may include one or more CSS(s) corresponding to respective CCE aggregation level L.

Herein, 'a UE monitor PDCCH for a search space set s' also refers to 'a UE may monitor a set of PDCCH candidates of the search space set s'. Alternatively, 'a UE monitor PDCCH for a search space set s' also refers to 'a UE may attempt to decode each PDCCH candidate of the search space set s according to the monitored DCI formats'. As above-mentioned, the PDCCH is used for transmitting or carrying Downlink Control Information (DCI). Thus, 'PDCCH', 'DCI', 'DCI format', and/or 'PDCCH candidate' are virtually interchangeable. In other words, 'a UE monitors PDCCH' implies 'a UE monitors PDCCH for a DCI format'. That is, 'a UE monitors PDCCH' implies 'a UE monitors PDCCH for detection of a configured DCI format'.

In the present disclosure, the term "PDCCH search space sets" may also refer to "PDCCH search space". A UE monitors PDCCH candidates in one or more of search space sets. A search space sets can be a common search space (CSS) set or a UE-specific search space (USS) set. In some implementations, a CSS set may be shared/configured among multiple UEs. The multiple UEs may search PDCCH candidates in the CSS set. In some implementations, a USS set is configured for a specific UE. The UE may search one or more PDCCH candidates in the USS set. In some implementations, a USS set may be at least derived from a value of C-RNTI addressed to a UE.

An illustration of CORESET configuration is described below.

A base station may configure a UE one or more CORE-SETs for each DL BWP in a serving cell. For example, a RRC parameter ControlResourceSetZero is used to configure CORESET 0 of an initial DL BWP. The RRC parameter ControlResourceSetZero corresponds to 4 bits. The base station may transmit ControlResourceSetZero, which may be included in MIB or RRC parameter ServingCellConfig-Common, to the UE. MIB may include the system information transmitted on BCH(PBCH). A RRC parameter related to initial DL BWP configuration may also include the RRC parameter ControlResourceSetZero. RRC parameter ServingCellConfigCommon is used to configure cell specific parameters of a UE's serving cell and contains parameters which a UE would typically acquire from SSB, MIB or SIBs when accessing the cell form IDLE.

Additionally, a RRC parameter ControlResourceSet is used to configure a time and frequency CORESET other than CORESET 0. The RRC parameter ControlResourceSet may include a plurality of RRC parameters such as, ControlResourceSetId, frequencyDomainResource, duration, cce-REG-MappingType, precoderGranularity, tci-Pres-entInDCI, pdcch-DMRS-ScramblingID and so on.

Here, the RRC parameter ControlResourceSetId is an CORESET index p, used to identify a CORESET within a serving cell, where 0<p<12. The RRC parameter duration indicates a number of consecutive symbols of the CORE-SET $N_{symb}^{CORESET}$, which can be configured as 1, 2 or 3 symbols. A CORESET consists of a set of $N_{RB}^{CORESET}$ resource blocks (RBs) in the frequency domain and $N_{symb}^{CORESET}$ symbols in the time domain. The RRC parameter frequencyDomainResource indicates the set of $N_{RB}^{CORESET}$ RBs for the CORESET. Each bit in the frequencyDomainResource corresponds a group of 6 RBs, with grouping starting from the first RB group in the BWP. The first (left-most/most significant) bit corresponds to the first RB group in the BWP, and so on. The first common RB of the first RB group has common RB index 6×ceiling $(N_{BWP}^{start}/6)$. A bit that is set to 1 indicates that this RB group belongs to the frequency domain resource of this CORESET. Bits corresponding to a group of RBs not fully contained in the bandwidth part within which the CORESET is configured are set to zero. The ceiling(A) function here-inafter is to output a smallest integer not less than A.

According to the CORESET configuration, a CORESET (a CORESET 0 or a CORESET p) consists of a set of PRBs with a time duration of 1 to 3 OFDM symbols. The resource units Resource Element Groups (REGs) and Control Channel Elements (CCEs) are defined within a CORESET. A CCE consists of 6 REGs where a REG equals one resource block during one OFDM symbol. Control channels are formed by aggregation of CCE. That is, a PDCCH consists of one or more CCEs. Different code rates for the control channels are realized by aggregating different number of CCE. Interleaved and non-interleaved CCE-to-REG map-ping are supported in a CORESET. Each resource element group carrying PDCCH carries its own DMRS.

Figure 4:
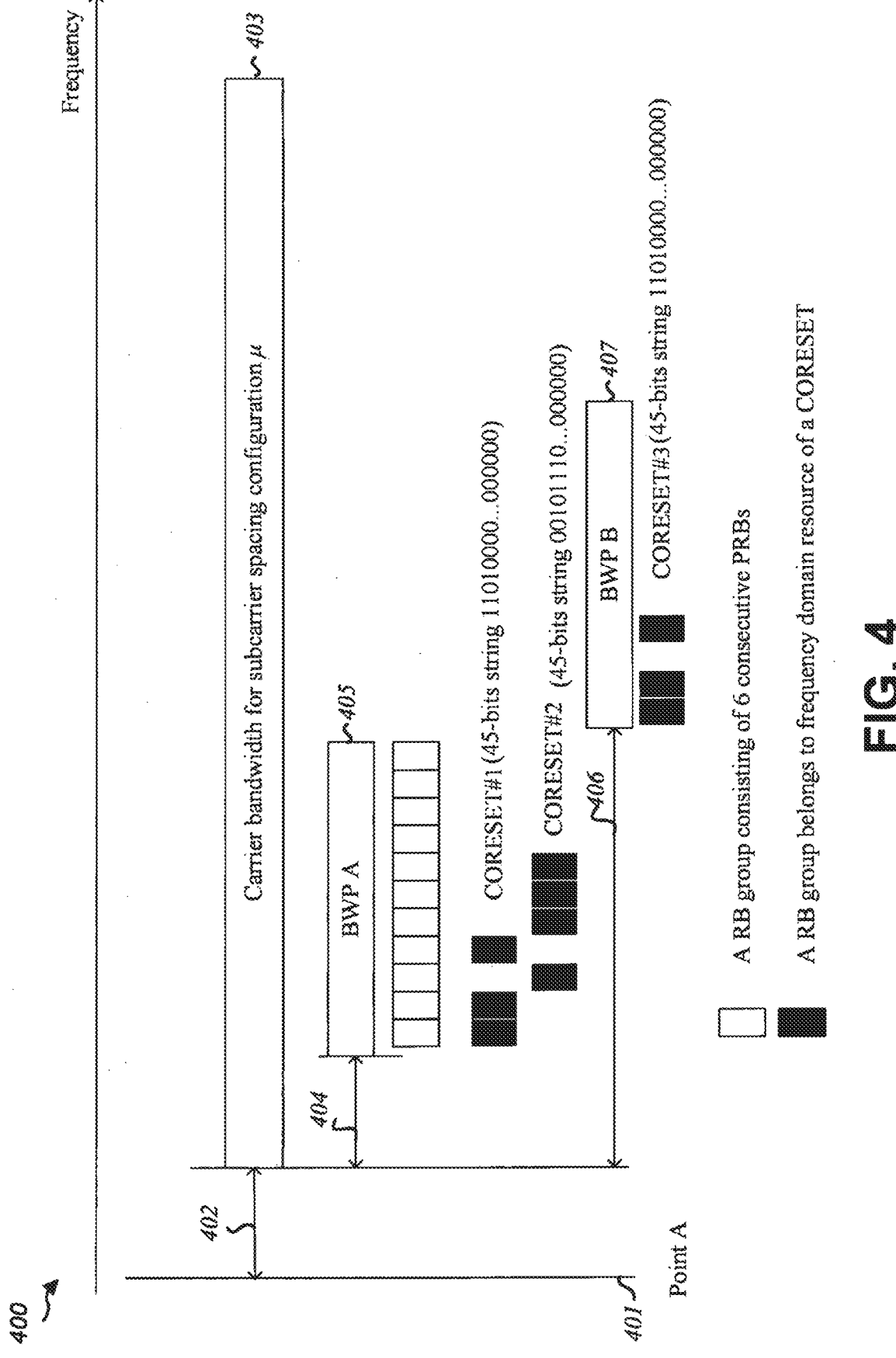
FIG. 4 is a diagram illustrating one 400 example of CORESET configuration in a BWP by a UE 102 and a base station 160.

FIG. 4 is a diagram illustrating one 400 example of CORESET configuration in a BWP by a UE 102 and a base station 160.

FIG. 4 illustrates that a UE 102 is configured with three CORESETs for receiving PDCCH transmission in two BWPs. In the FIG. 4, 401 represent point A. 402 is an offset in frequency domain between point A 401 and a lowest usable subcarrier on the carrier 403 in number of CRBs, and the offset 402 is given by the offsetToCarrier in the SCS-SpecificCarrier IE. The BWP 405 with index A and the carrier 403 are for a same subcarrier spacing configuration μ. The offset 404 between the lowest CRB of the carrier and the lowest CRB of the BWP in number of RBs is given by the locationAndBandwidth included in the BWP configuration for BWP A. The BWP 407 with index B and the carrier 403 are for a same subcarrier spacing configuration μ. The offset 406 between the lowest CRB of the carrier and the lowest CRB of the BWP in number of RBs is given by the locationAndBandwidth included in the BWP configuration for BWP B.

For the BWP 405, two CORESETs are configured. As above-mentioned, a RRC parameter frequencyDomainRe-source in respective CORESET configuration indicates the frequency domain resource for respective CORESET. In the frequency domain, a CORESET is defined in multiples of RB groups and each RB group consists of 6 RBs. For example, in the FIG. 4, the RRC parameter frequencyDo-mainResource provides a bit string with a fixed size (e.g. 45 bits) as like '11010000 . . . 000000' for CORESET #1. That is, the first RB group, the second RB group, and the fourth RB group belong to the frequency domain resource of the CORESET #1. Additionally, the RRC parameter frequen-cyDomainResource provides a bit string with a fixed size (e.g. 45 bits) as like '00101110 . . . 000000' for CORESET #2. That is, the third RB group, the fifth RB group, the sixth RB group and the seventh RB group belong to the frequency domain resource of the CORESET #2.

For the BWP 407, one CORESET is configured. As above-mentioned, a RRC parameter frequencyDomainResource in the CORESET configuration indicates the frequency domain resource for the CORESET #3. In the frequency domain, a CORESET is defined in multiples of RB groups and each RB group consists of 6 RBs. For example, in the FIG. 4, the RRC parameter frequencyDomainResource provides a bit string with a fixed size (e.g. 45 bits) as like '11010000 . . . 000000' for CORESET #3. That is, the first RB group, the second RB group, and the fourth RB group belong to the frequency domain resource of the CORESET #3. Although the bit string configured for CORESET #3 is same as that for CORESET #1, the first RB group of the BWP B is different from that of the BWP A in the carrier. Therefore, the frequency domain resource of the CORESET #3 in the carrier is different from that of the CORESET #1 as well.

Illustration of SS/PBCH blocks is described hereinafter.

Figure 5:
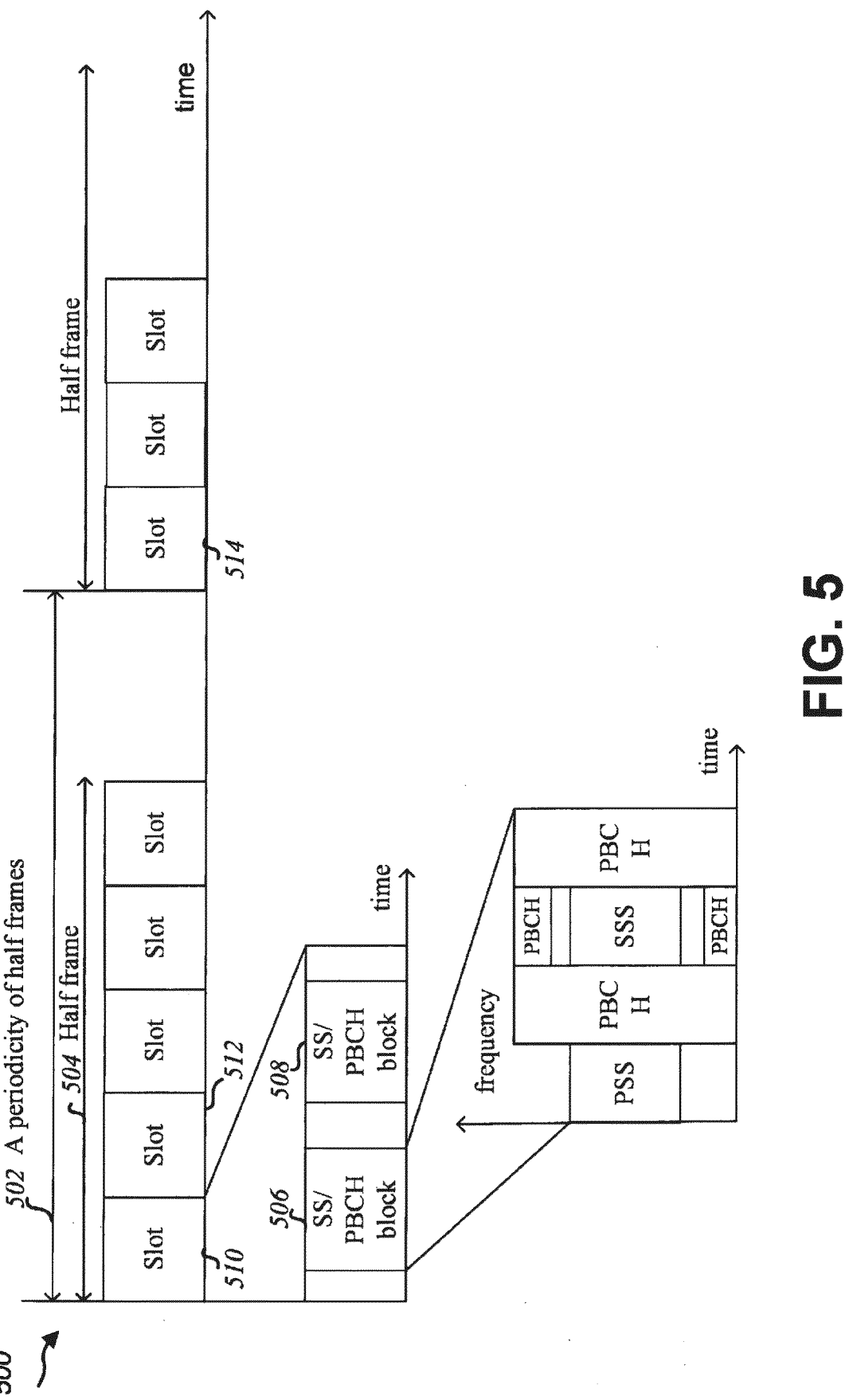
FIG. 5 is a diagram illustrating one example 500 of SS/PBCH block transmission.

A SS/PBCH block (or a SSB) is a unit block consisting of primary and secondary synchronization signals (PSS, SSS), each occupying 1 symbol and 127 subcarriers and PBCH spanning across 3 OFDM symbols and 240 subcarriers, but on one symbol leaving an unused part in the middle for SSS as show in FIG. 5. FIG. 5 is a diagram illustrating one example 500 of SS/PBCH block transmission. The UE 102 receives/detect the SS/PBCH block to acquire time and frequency synchronization with a cell and detect the physical layer Cell ID of the cell. The possible time locations of SS/PBCH blocks within a half-frame are determined by subcarrier spacing and the periodicity of the half-frames where SS/PBCH blocks are transmitted is configured by the base station. During a half frame, different SS/PBCH blocks may be transmitted in different spatial directions (i.e. using different beams, spanning the coverage area of a cell). Within the frequency span of a carrier, multiple SS/PBCH blocks can be transmitted. For a half frame with SS/PBCH blocks, the first symbol indexes for candidate SS/PBCH blocks are determined according to the SCS of SS/PBCH blocks as follows, where index 0 corresponds to the first symbol of the first slot in a half-frame.

Case A—15 kHz SCS: the first symbols of the candidate SS/PBCH blocks have indexes of $\{2,8\}+14*n$. n can be either n=0, 1 or n=0, 1, 2, 3 depending on the carrier frequencies.

Case B—30 kHz SCS: the first symbols of the candidate SS/PBCH blocks have indexes of $\{4, 8, 16, 20\}+28*n$. n can be either n=0 or n=0, 1 depending on whether the carrier frequencies is larger than 3 GHz.

Case C—30 kHz SCS: the first symbols of the candidate SS/PBCH blocks have indexes of $\{2, 8\}+14*n$. n can be either n=0, 1 or n=0, 1, 2, 3 depending on the carrier frequencies.

Case D—120 kHz SCS: the first symbols of the candidate SS/PBCH blocks have indexes $\{4, 8, 16, 20\}+28*n$ where n=0, 1, 2, 3, 5, 6, 7, 8, 10, 11, 12, 13, 15, 16, 17, 18.

Case E—240 kHz SCS: the first symbols of the candidate SS/PBCH blocks have indexes $\{8, 12, 16, 20, 32, 36, 40, 44\}+56*n$ where n=0, 1, 2, 3, 5, 6, 7, 8.

The maximum number of the SS/PBCH blocks within a half-frame is different for different carrier frequencies. The candidate SS/PBCH blocks in a half frame are assigned an SS/PBCH block index. The candidate SS/PBCH blocks in a half frame are indexed in an ascending order in time from 0 to $L_{max}-1$. The UE 102 determines the 2 LSB bits, for $L_{max}=4$, or the 3 LSB bits, for $L_{max}>4$, of a SS/PBCH block index per half frame form a one-to-one mapping with an index of the DM-RS sequence transmitted in the PBCH. For $L_{max}=64$, the UE 102 determines the 3 MSB bits of the SS/PBCH block index per half frame from PBCH payload bits. That is, when the UE 102 detects/receives an SS/PBCH block, the UE 102 calculates an SS/PBCH block index based on PBCH information and/or reference signal information (DMRS sequence) included in the detected SS/PBCH block. Moreover, upon detection of a SS/PBCH block with an index, the UE 102 may determine from the MIB that a CORESET for Type0-PDCCH CSS set, and the Type0-PDCCH CSS set.

FIG. 5 is an example of the Case A. In the FIG. 5, a half frame 504 has 5 slot. According to the case A, when n=0, 1, the base station may transmit SS/PBCH blocks in the first two slots within the half frame 504. When n=0, 1, 2, 3, the base station may transmit SS/PBCH blocks in the first four slots within the half frame 504.

According to the Case A, the index for the first symbol of the first SS/PBCH block with index 0 506 is an index 2 of the first slot 510 in the half-frame 504, the index for the first symbol of the second SS/PBCH block with index 1 508 is an index 8 of the first slot 510 in the half-frame 504, the index for the first symbol of the third SS/PBCH block with index 2 is an index 2 of the second slot 512 in the half-frame 504, and so on.

The UE can be provided per serving cell by a RRC parameter indicating a periodicity of the half frames 502 for reception of the SS/PBCH blocks for the serving cell. If the UE is not provided by the RRC parameter, the periodicity of the half frames 502 for reception of the SS/PBCH blocks is a periodicity of a half frame. In this case, the 502 is equivalent to the 504. The periodicity is same for all SS/PBCH blocks in the serving cell. For example, the SS/PBCH with index 0 506 is transmitted in the slot 510. A next SS/PBCH with index 0 may be transmitted in a slot 514 after the periodicity of half frames 502 starting from the slot 510.

Additionally, after performing initial cell selection, the UE may assume that half frames with SS/PBCH blocks occur with a periodicity of 2 frames. That is, the UE may receive a SS/PBCH block with an index in a slot and then may further receive a SS/PBCH block with the same index in a slot after the periodicity of 2 frames.

The base station may transmit a set of SS/PBCH blocks in a serving cell and indicate the indices of the transmitted SS/PBCH blocks within a half-frame to UEs camping on the serving cell via SIB1. In other words, the base station 160 may indicate the time domain positions of the transmitted SS/PBCH blocks within a half frame. As above-mentioned, upon detection of a SS/PBCH block with an index, a UE may determine from the MIB a CORESET for Type0-PDCCH CSS set and the Type0-PDCCH CSS set. The UE monitors PDCCH in the Type 0-PDCCH CSS set to receive the SIB1. Then according to the received SIB1, the UE may determine, within a half-frame, a set of SS/PBCH blocks which are transmitted by the base station. In other words, the UE may determine, within a half-frame, the time domain positions of a set of SS/PBCH blocks which are transmitted by the base station.

Hereinafter, random access procedure is described.

Random access procedure may include the transmission of random access preamble (Msg1 or Message 1) in a PRACH, the reception of random access response (RAR) message with a PDCCH and/or a PDSCH (Msg2, Message 2), the transmission of a PUSCH scheduled by a RAR UL grant (e.g., Msg 3, Message 3), and the reception of PDSCH for contention resolution.

Before initiating a random access procedure, the UE 102 may, based on the received SIB1, obtain a set of SS/PBCH block indexes. A set of SS/PBCH blocks corresponding to the indexes in the set of SS/PBCH block indexes are transmitted by the base station. The UE 102 may perform reference signal received power (RSRP) measurements for the set of SS/PBCH blocks. On the other hand, the UE 102 may not perform RSRP measurements for those candidate SS/PBCH blocks which are not transmitted by the base station.

The secondary synchronization signals of a SS/PBCH block is used for the RSRP determination for the corresponding SS/PBCH block. The number of resource elements carrying the secondary synchronization signals of the SS/PBCH block (or the SS/PBCH blocks with the same SS/PBCH block index) within a measurement period may be used by the UE 102 to determine the RSRP of the SS/PBCH block. Additionally, the demodulation reference signals for PBCH of the SS/PBCH block and/or configured CSI reference signals can also be used by the UE 102 to determine the RSRP of the SS/PBCH block.

Before initiating a random access procedure, the UE 102 may receive, from the base station 160, the information for the random access procedure. The information (i.e. the random access information) includes the cell-specific random access parameters and/or the dedicated random access parameters. The random access information may be indicated by the broadcasted system information (e.g., MIB, SIB1, and/or other SIBs) and/or RRC message and so on. For example, the information may include the configuration of PRACH transmission parameters such as time resources for PRACH transmission, frequency resources for PRACH transmission, the PRACH preamble format, preamble SCS and so on. The information may also include parameters for determining the root sequences (logical root sequence index, root index) and their cyclic shifts (CSs) in the PRACH preamble sequence set.

The random access preamble (PRACH preamble, or preamble) sequence is based on the Zadoff-Chu sequence. The logical root for the Zadoff-Chu sequence is provided by the information as above-mentioned. That is, a UE can generate a set of PRACH preamble sequences based on the Zadoff-Chu sequence corresponding to a root sequence indicated by the base station 160. There are two sequence lengths for the preamble. One is 839 and the other one is 139.

A preamble is transmitted by the UE 102 in a time-frequency PRACH occasion. A PRACH occasion is a time-frequency resource where the base station configures to multiple UEs for preamble transmission. Three are 64 preambles defined in each time-frequency PRACH occasion. In other words, the UE 102 may generate 64 preambles for each PRACH occasion. The preambles (e.g. 64 preambles) in one PRACH occasion may be generated by one root Zadoff-Chu sequence or more than one root Zadoff-Chu sequences. The number of preambles generated from a single root Zadoff-Chu sequence at least depends on the sequence length and/or a distance of the cyclic shifts between two preambles with consecutive preamble indices. The distance of the cyclic shifts is provided by the base station 160.

Therefore, in some cases, the UE 102 can generate 64 preambles from a single root Zadoff-Chu sequence. In some cases, the UE 102 cannot generate 64 preambles from a single root Zadoff-Chu sequence. In these cases, in order to obtain the 64 preambles in a PRACH occasion, the UE 102 needs to generate the 64 preambles from multiple root Zadoff-Chu sequences with multiple consecutive root indices. The starting root index of the multiple consecutive root indices is indicated by the base station 160. The UE 102 and the base station 160 may enumerate the 64 preambles in increasing order of first increasing cyclic shift (CS) of a logical root Zadoff-Chu sequence, and then in increasing order of the logical root sequence index. The preamble indices for 64 preambles in a PRACH occasion are from 0 to 63.

The random access information may include a RRC parameter indicating how many SS/PBCH blocks is associated with a PRACH occasion. For example, if a value indicated by the RRC parameter is one half (i.e. ½), it implies that one SS/PBCH block is associated with two PRACH occasions. For example, if a value indicated by the RRC parameter is two (i.e. 2), it implies that two SS/PBCH blocks are associated with one PRACH occasion.

In addition, the random access information may include a RRC parameter indicating how many frequency multiplexed PRACH occasions there are in one time instance. The random access information may include a RRC parameter indicating an offset of lowest PRACH occasion in frequency domain with respective to PRB0 of the active UL BWP. The UE 102 may determine starting symbol of a PRACH occasion, a number of PRACH occasions in time domain within a PRACH slot, a duration in symbols of the PRACH occasion according to the random access information.

As above-mentioned, SIB1 indicates a set of SS/PBCH blocks which are transmitted by the base station. In other words, the SIB1 provides SS/PBCH block indexes with which a set of SS/PBCH blocks are transmitted by the base station. The base station and/or the UE may only map the SS/PBCH indexes provided in the SIB1 to the PRACH occasions in accordance with the following rules: (i) first, in increasing order of preamble indexes within a single PRACH occasion, (ii) second, in increasing order of frequency resource indexes for frequency multiplexed PRACH occasions, (iii) third, in increasing order of time resource indexes for time multiplexed PRACH occasions within a PRACH slot, (iv) in increasing order of indexes for PRACH slots.

Figure 6:
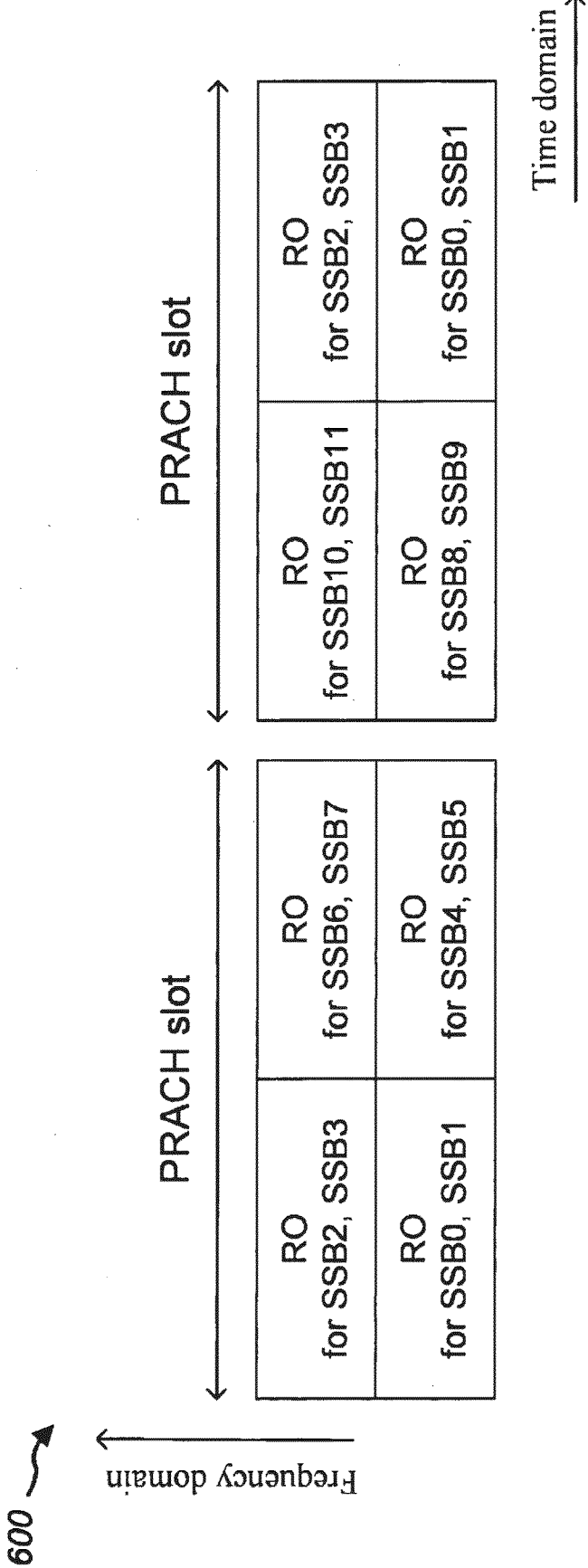
FIG. 6 is a diagram illustrating one example 600 of mapping SS/PBCH block indexes to PRACH occasions.

FIG. 6 is a diagram illustrating one example 600 of mapping SS/PBCH block indexes to PRACH occasions.

In the FIG. 6, the random access information indicates that two SS/PBCH blocks are mapped to one PRACH occasion and there are two frequency multiplexed PRACH occasions in one time instance. And the random access information indicates that there are two time multiplexed PRACH occasions in one PRACH slot.

Figure 7:
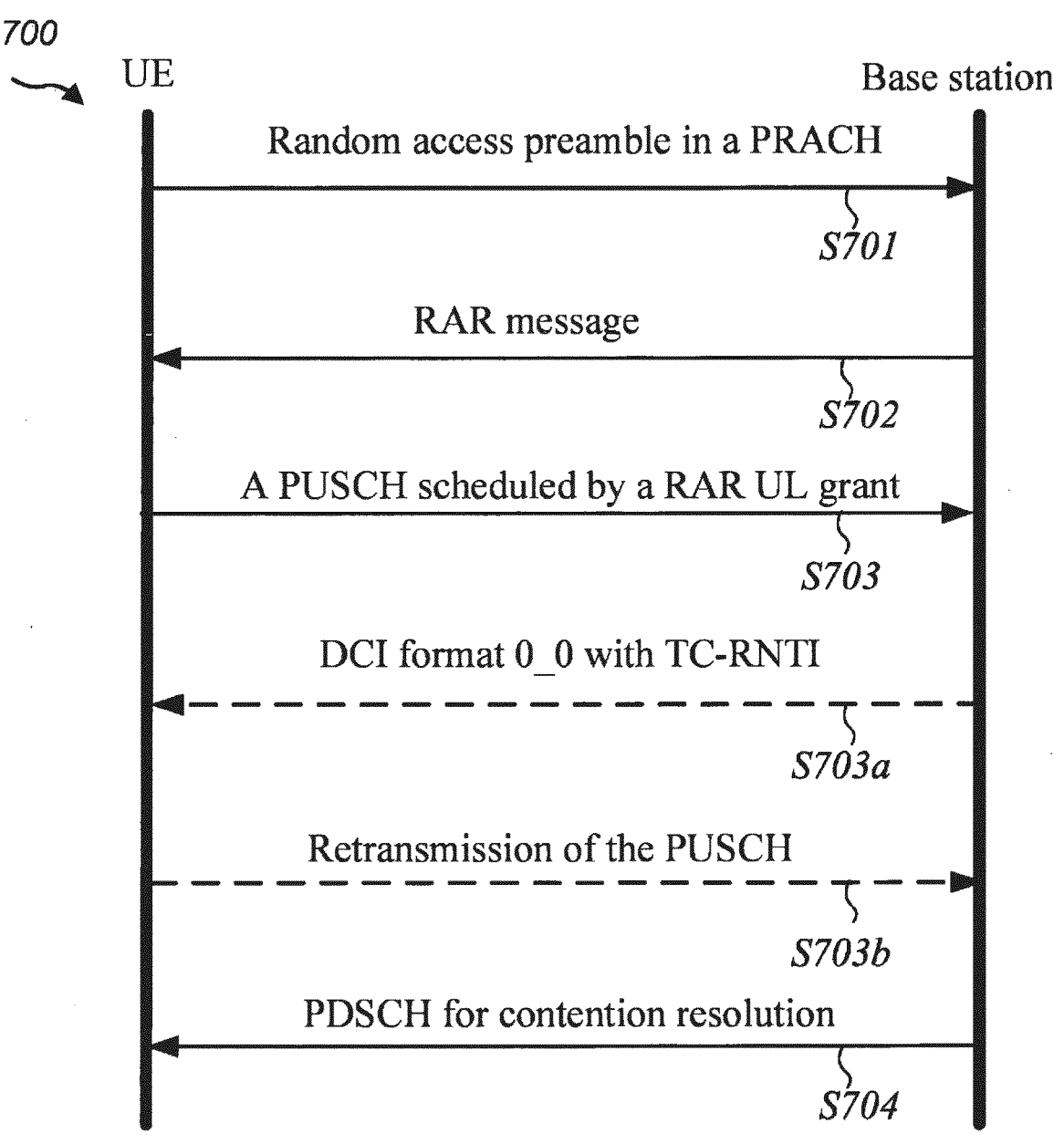
FIG. 7 is a diagram illustrating one 700 example of random access procedure.

FIG. 7 is a diagram illustrating one 700 example of random access procedure.

In S 701, the UE 102 may transmit a random access preamble to the base, station 160 via a PRACH. The transmitted random access preamble may be referred to as a message 1 (Msg.1). The transmission of the random access preamble (i.e. the transmission of the preamble) can be also referred to as PRACH transmission.

The UE 102 may randomly select a preamble with a random access preamble identity (RAPID) in a PRACH occasion. There are 64 preambles (preamble index) for each PRACH occasion. To be specific, the UE 102 may first measure the reference signal received power (RSRP) of a set of SS/PBCH blocks. If one or more SS/PBCH blocks with measured RSRP value above a threshold in the set of SS/PBCH blocks are available for the UE 102, the UE 102 may select one from the one or more SS/PBCH blocks. If there is no SS/PBCH block with measure RSRP value above the threshold in the set of SS/PBCH blocks, the UE may select one SS/PBCH block from the set of SS/PBCH blocks. The set of SS/PBCH blocks is provided by the SIB1. The threshold is an RSRP threshold for the selection of the SS/PBCH block and is indicated by the base station 160 for example via the SIB1.

After selecting the SS/PBCH block, the UE 102 may determine the PRACH occasions corresponding to the selected SS/PBCH block. In a PRACH occasion associated with the selected SS/PBCH block, the UE 102 may randomly select a preamble associated with the selected SS/PBCH block and transmit it to the base station 160.

In S 702, if the base station 160 received a preamble in a PRACH occasion, the base station 160 may generate a transport block in response to the reception of the preamble. The transport block (i.e. a MAC PDU) herein is referred to as a random access response (or a random access response message). That is to say, the base station 160 may transmit a PDCCH with a DCI format 1_0 with CRC scrambled by a RA-RNTI and the transport block in a corresponding PDSCH scheduled by the DCI format 1_0. The value of the RA-RNTI is calculated at least based on the time and frequency information of the PRACH occasion where the preamble is received. For example, the RA-RNTI can be calculated as RA-RNTI=1+s_id+14×t_id+14×80×f_id+14×80×8×ul_carrier_id. Here, s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the UL carrier used for random access preamble transmission (0 for NUL carrier, and 1 for SUL carrier).

In S 702, in response to the transmission of the preamble, the UE 102 may attempt to detect a DCI format 1_0 with CRC scrambled by the RA-RNTI as above-mentioned during a window in the Type1-PDCCH CSS set. The length of the window in number of slots, based on the SCS for Type 1-PDCCH CSS set, is provided by the base station 160 for example via the SIB1. And the window start at the first symbol of the earliest CORESET where the UE 102 is configured to receive PDCCH for Type 1-PDCCH CSS set, that is at least one symbol after the last symbol of the PRACH occasion where the preamble is transmitted. The symbols duration corresponds to the SCS for Type 1-PDCCH CSS set.

If the UE 102 detects the DCI format 1_0 with CRC scrambled by the RA-RNTI, the UE 102 may receive a transport block in a corresponding PDSCH scheduled by the DCI format 1_0 within the window. The UE may parse the transport block (i.e. the MAC PDU) for a random access preamble identity (RAPID) associated with the transmitted preamble.

A MAC PDU (random access response, RAR) consists of one or more MAC subPDUs and optionally padding. Each MAC subPDU consists one of the followings: (i) a MAC subheader with Backoff Indicator only, (ii) a MAC subheader with RAPID only, and (iii) a MAC subheader with RAPID and MAC RAR.

A MAC subheader with Backoff Indicator consists of five header fields E/T/R/R/BI. A MAC subPDU with Backoff Indicator only is placed at the beginning of the MAC PDU, if included. 'MAC subPDU(s) with RAPID only' and 'MAC subPDU(s) with RAPID and MAC RAR' can be placed anywhere between MAC subPDU with Backoff Indicator only (if any) and padding (if any). Padding is placed at the end of the MAC PDU if present. Presence and length of padding is implicit based on TB size and size of MAC subPDUs.

If the RAPID in RAR message(s) (i.e. MAC RAR(s)) of the transport block is identified, the UE may obtain an uplink grant which is also referred as a RAR UL grant. That is, if there is a MAC subPDU with a RAPID corresponding to the RAPID of the preamble which is transmitted by the UE 102, the UE 102 may obtain a RAR UL grant provided by the MAC RAR included in the MAC subPDU with the RAPID corresponding to the transmitted preamble. The size of the RAR UL grant is 27 bits. The RAR UL grant is used to indicate the resources to be used for the PUSCH transmission. That is, the RAR UL grant is used to schedule a PUSCH transmission for the UE 102. In addition to the RAR UL grant, the MAC subPDU may also provide, to the UE 102, a timing advance command field with 12 bits, a Temporary C-RNTI field with 16 bits and a reserved bit with 1 bit.

FIG. 8 is a diagram illustrating one 800 example of fields included in an RAR UL grant. The RAR UL grant may at least include the fields as given in the FIG. 8. The fields of the RAR UL grant starts with the MSB of the RAR UL grant and ends with the LSB of the RAR UL grant.

In a case that the value of a frequency hopping flag is 0, the UE 102 may transmit the PUSCH scheduled by the RAR UL grant without frequency hopping. In a case that the value of a frequency hopping flag is 1, the UE 102 may transmit the PUSCH scheduled by the RAR UL grant with frequency hopping. The 'PUSCH time resource allocation' field is used to indicate resource allocation in the time domain for the PUSCH scheduled by the RAR UL grant. The 'MCS' field is used to determine an MCS index for the PUSCH scheduled by the RAR UL grant. The 'TPC command for PUSCH' field is used for setting the power of the PUSCH scheduled by the RAR UL grant. The 'CSI request' field is reserved. The 'PUSCH frequency resource allocation' field is used to indicate resource allocation in the frequency domain for the PUSCH scheduled by the RAR UL grant.

On the other hand, if the UE 102 does not detect the DCI format 1_0 with CRC scrambled by the corresponding RA-RNTI within the window, or if the UE 102 does not correctly receive the transport block in the corresponding PDSCH within the window, or if the UE 102 do not identify the RAPID associated with the transmitted preamble from the UE 102, the UE may transmit a PRACH one more time. That is, the UE 102 may perform S 701.

In S 703, the UE 102 transmits, to the base station, a transport block in the PUSCH scheduled by the RAR UL grant in the active UL BWP. The transport block may contain a UE identity, for example, a CCCH SDU, a C-RNTI MAC CE. The PUSCH containing a CCCH SDU or a C-RNTI MAC CE can be also referred to as Msg 3 (Message 3).

The base station 160 may not successfully decode the transport block which is transmitted by the UE 102 in the PUSCH scheduled by the RAR UL grant. Then, the base station 160 may request the UE 102 to retransmit the transport block. In this case, the base station 160 may generate a DCI format 0_0 with CRC scrambled by the TC-RNTI for a corresponding PUSCH retransmission of the transport block. And the base station 160 may transmit the DCI format 0_0 with CRC scrambled by the TC-RNTI to the UE 102 in S 703*a*. As above-mentioned, the TC-RNTI is provided in the corresponding MAC RAR (RAR message).

After transmitting the PUSCH scheduled by the RAR UL grant, the UE 102 may receive a PDCCH with a DCI format 0_0 with CRC scrambled by the TC-RNTI. In this case, the UE 102 may perform a corresponding PUSCH retransmission scheduled by the DCI format 0_0 in S 703*b*. The PUSCH retransmission of the transport block is scheduled by the DCI format 0_0 with CRC scrambled by the TC-RNTI.

In S 704, if the base station 160 successfully decoded the transport block, the base station 160 may generate and transmit a DCI format 1_0 with CRC scrambled by the TC-RNTI scheduling a PDSCH that includes a UE contention resolution identity (i.e. a UE contention resolution identity MAC CE). The UE contention resolution identity contains the CCCH SDU transmitted in the S 703. The UE resolution identity MAC CE contains part or all of the CCCH SDU transmitted by the UE 102 (UL CCCH SDU). If the UL CCCH SDU is longer than 48 bits, the UE resolution identity MAC CE contains the first 48 bits of the UL CCCH SDU The UE contention resolution identity contributes to resolving contention between multiples UEs who transmitted a same preamble in a same PRACH occasion. A UE may compare the UE contention resolution identity received in the S 704 with the CCCH SDU transmitted in the S 703. If the UE contention resolution identity matches the transmitted CCCH SDU, the UE 102 considers the contention resolution successful and considers the random access procedure successfully completed. On the other hand, if the UE contention resolution identity does not match the transmitted CCCH SDU, the UE 102 considers the contention resolution not successful.

In response to the PDSCH reception with the UE contention resolution identity, the UE 102 may transmit HARQ-ACK information in a PUCCH using frequency hopping to the base station 160. The UE 102 may generate one HARQ-ACK information bit in response to the PDSCH reception with the UE contention resolution identity. The UE 102 may transmit a PUCCH with the HARQ-ACK information in a cell specific PUCCH resource in the initial UL BWP.

PUCCH support multiple PUCCH formats as like PUCCH formats 0, 1, 2, 3, and 4. On the other hand, cell specific PUCCH resource corresponds to PUCCH format 0 and PUCCH format 1. For a PUCCH transmission with PUCCH format 0, the number of HARQ-ACK information bits is 1 or 2. A PUCCH resource with PUCCH format 0 can be configured with 1 symbol or 2 symbols in time domain and is configured with 1 RB in frequency domain. A low PAPR sequence (i.e. Zadoff-Chu sequence) with length 12 is used as a base sequence for the PUCCH format 0. UP to 12 different phase rotations i.e. different cyclic shifts in time domain can be applied to a same base sequence. Different cyclic shifts represent different HARQ-ACK information bits. The PUCCH with PUCCH format 0 is transmitted by the UE 102 in one PRB. For a PUCCH transmission with PUCCH format 1, the number of HARQ-ACK information bits is 1 or 2. A PUCCH resource with PUCCH format 1 can be configured with from 4 symbol to 14 symbols in time domain and is configured with 1 RB in frequency domain. Information bit(s) including HARQ-ACK information and/or SR information shall be modulated using BPSK or QPSK, which results in a complex-valued symbol. The complex-valued symbol shall be multiplied with a low PAPR sequence with length 12. The complex-valued symbol is a modulated sequence with length 12 while DMRS symbol is a unmodulated sequence with length 12. The block of complex-valued symbol is bock-wise spread with an orthogonal DFT code of the same length as the number of symbols used for transmission of HARQ-ACK information and/or SR. DMRS symbols. The complex-valued symbol(s) and associated DMRS symbol(s) are alternately mapped to the symbols of the PUCCH resource with the PUCCH format 1. To be specific, associated DMRS(s) for PUCCH format 1 are mapped to symbols with even indexes of the PUCCH resource with the PUCCH format 1, e.g. symbols with indexes 0, 2, 4, etc. The complex-valued symbol(s) are mapped to symbols with odd indexes of the PUCCH resource with the PUCCH format 1, e.g. symbols with indexes 1, 3, 5, etc. The PUCCH with PUCCH format 1 is transmitted in one PRB.

In NR Release 15/16, the maximum bandwidth that NR Release 15/16 UEs can support are 100 MHz for FR1 and 200 MHz for FR2. Compared with the Release 15/16 UEs, cost reduction for a new UE type (e.g., wearable devices, industrial sensors, video surveillance) is desirable. To reduce the cost and the complexity, the UE with new type would be equipped with less reception antennas and/or the reduced bandwidth (i.e. RF bandwidth and/or baseband bandwidth) relative to the NR Release 15/16 UEs. The reduced reception antennas would result in a reduced power for the received channels/signals. The reduced bandwidth would also result in a reduced frequency diversity. The maximum bandwidth that UEs with reduced bandwidth can support may be, for example, 20 MHz for FR1 and 100 MHz for FR2. This kind of UEs can be termed 'RedCap UEs'. The NR Release 15/16 UE can be termed 'non-RedCap UE'. A UE 102 hereinafter in the present disclosure may refer to the RedCap UEs with reduced bandwidth including reduced RF bandwidth and/or reduced baseband bandwidth. That is, the maximum bandwidth the UE 102 can support may be 20 MHz for FR1 and may be 100 MHz for FR2.

In a serving cell, the base station may configure BWPs (DL BWPs and/or UL BWPs) with different bandwidths and different frequency locations for different UEs. For a UE, a configurable bandwidth of a BWP (a DL BWP and/or a UL BWP) is subject to the UE's bandwidth capability, i.e. the maximum bandwidth the UE can support. The base station may not configure a UE with a BWP whose bandwidth is wider than the maximum bandwidth the UE can support. The UE may not operate with a BWP whose bandwidth is wider than the maximum bandwidth the UE can support. In a serving cell, due to different bandwidth capabilities of different UEs, for example, the base station may configure a non-RedCap UE with a BWP whose bandwidth can be up to 100 MHz, and may configure a RedCap UE with a BWP whose bandwidth can be up to 20 MHz.

As above-mentioned, the RRC parameters initialUplinkBWP may indicate the initial UL BWP configuration for a serving cell (e.g., a SpCell and Scell). The base station may transmit initialDownlinkBWP and/or initialUplinkBWP which may be included in SIB1, RRC parameter ServingCellConfigCommon, or RRC parameter ServingCellConfig to the UE. The RRC parameters initialUplinkBWP included in the SIB1 is used to indicate the initial UL BWP configuration for a primary cell. Additionally or alternatively, a RRC parameter initialUplinkBWP-redCap may be included in the SIB1 as well. The initialUplinkBWP-redCap can be used to indicate the initial UL BWP configuration for a primary cell. Either initialUplinkBWP and initialUplinkBWP-redCap may include generic parameters (e.g. locationAndBandwidth, subcarrierSpacing, cyclicPrefix) of the initial UL BWP, cell specific parameters (e.g. pucch-ConfigCommon) for PUCCH of the initial UL BWP, cell specific parameters (e.g. pusch-ConfigCommon) for the PUSCH of the initial UL BWP, and cell specific random access parameters (e.g. rach-ConfigCommon).

For operation on the primary cell, the base station 160 may configure a UE 102 with an initial UL BWP according to the initialUplinkBWP or initialUplinkBWP-redCap. For operation on the primary cell, a UE 102 is provided an initial UL BWP by initialUplinkBWP-redCap, if the initialUplinkBWP-redCap is configured (or is provided); Otherwise, the UE 102 is provided an initial UL BWP by initialUplinkBWP. To be specific, for operation on the primary cell, in a case that the SIB1 includes the initialUplinkBWP-redCap, the UE 102 is provided an initial UL BWP by the initialUplinkBWP-redCap. In this case, the UE 102 may ignore the RRC parameter initialUplinkBWP included in the SIB1 and may apply initialUplinkBWP-redCap to determine the initial UL BWP. In other words, in a case that SIB1 includes the initialUplinkBWP-redCap, the UE 102 may determine an initial UL BWP based on the initialUplinkBWP-redCap and may determine the initial UL BWP not based on the initialUplinkBWP.

On the other hand, in a case that the SIB1 does not include the initialUplinkBWP-redCap and includes the initialUplinkBWP, the UE 102 is provided an initial UL BWP by the initialUplinkBWP. In this case, the UE 102 may apply initialUplinkBWP to determine the initial UL BWP. In other words, in a case that SIB1 does not include the initialUplinkBWP-redCap, the UE 102 may determine an initial UL BWP based on the initialUplinkBWP.

Hereinafter, cell specific PUCCH configuration is described.

As above-mentioned, in response to the PDSCH reception with the UE contention resolution identity, the UE 102 may transmit HARQ-ACK information in a PUCCH using frequency hopping to the base station 160. The UE 102 may generate one HARQ-ACK information bit in response to the PDSCH reception with the UE contention resolution identity. The UE 102 may transmit a PUCCH with the HARQ-ACK information in a cell specific PUCCH resource in the initial UL BWP. If the UE 102 has not been configured with dedicated PUCCH resource configuration, the UE 102 may use cell specific PUCCH resource configuration for PUCCH transmission with the HARQ-ACK information in the initial UL BWP.

The base station 160 may configure a PUCCH resource set, which includes one or multiple cell specific PUCCH resources, within an initial UL BWP for PUCCH transmission with HARQ-ACK information. The base station 160 and the UE 102 may be provided a predefined table associated to cell specific PUCCH resource configuration(s). Each row(entry) of the predefined table configures (or provides) a PUCCH resource set including a set of cell specific PUCCH resources. In other words, each entry of the predefined table configures a set of cell specific PUCCH parameters related to, for example, PUCCH format, first symbol, number of symbols, PRB offset, set of initial CS indexes. Each PUCCH resource corresponds to a PUCCH format, a first symbol, a duration, a PRB offset $RB_{BWP}^{offset}$, and an initial cyclic shift index in a set of initial cyclic shift indexes. In other words, each PUCCH resource can be identified by at least a PUCCH format, a first symbol, a duration, a PRB offset $RB_{BWP}^{offset}$, and an initial cyclic shift index.

The base station 160 may inform the UE 102 which row of the table is used for PUCCH transmission in the initial UL BWP via a RRC parameter (e.g. pucch-ResourceCommon). The RRC parameter pucch-ResourceCommon is included in broadcasted system information, for example, SIB1. To be specific, the pucch-ResourceCommon can be included in pucch-ConfigCommon of the initial UL BWP. As above-mentioned, the RRC parameter pucch-ConfigCommon is used to configure cell specific PUCCH parameters. The RRC parameter pucch-ResourceCommon is used to indicate an index corresponding to a row of the table. In other words, RRC parameter pucch-ResourceCommon is used to determine or provide a PUCCH resource set for PUCCH transmission in an initial UL BWP.

FIG. 9 is a diagram illustrating one example of one predefined table 900 associated to cell specific PUCCH resource configuration(s). The table 900 contains 16 rows (entries). Each row provides a PUCCH resource set. One PUCCH resource set includes sixteen resources, each corresponding to a PUCCH format, a first symbol, a duration (i.e. a number of symbols configured for each PUCCH resource), a PRB offset $RB_{BWP}^{offset}$, and a cyclic shift index set for a PUCCH transmission. The base station 160 may use the RRC parameter pucch-ResourceCommon to indicate which row is used for determining PUCCH resources (or a PUCCH resource set). For example, if the RRC parameter pucch-ResourceCommon is set to 0, the row with index 0 is used to determine a PUCCH resource set for PUCCH transmission with HARQ-ACK information in the initial UL BWP of $N_{BWP}^{size}$ PRBs. $N_{BWP}^{size}$ is a frequency-domain size of the initial UL BWP in unit of resource block, i.e. a number of resource blocks of the initial UL BWP. If the RRC parameter pucch-ResourceCommon is set to 8, the row with index 8 is used to determine a PUCCH resource set for PUCCH transmission with HARQ-ACK information in the initial UL BWP of $N_{BWP}^{size}$ PRBs.

Figure 10:
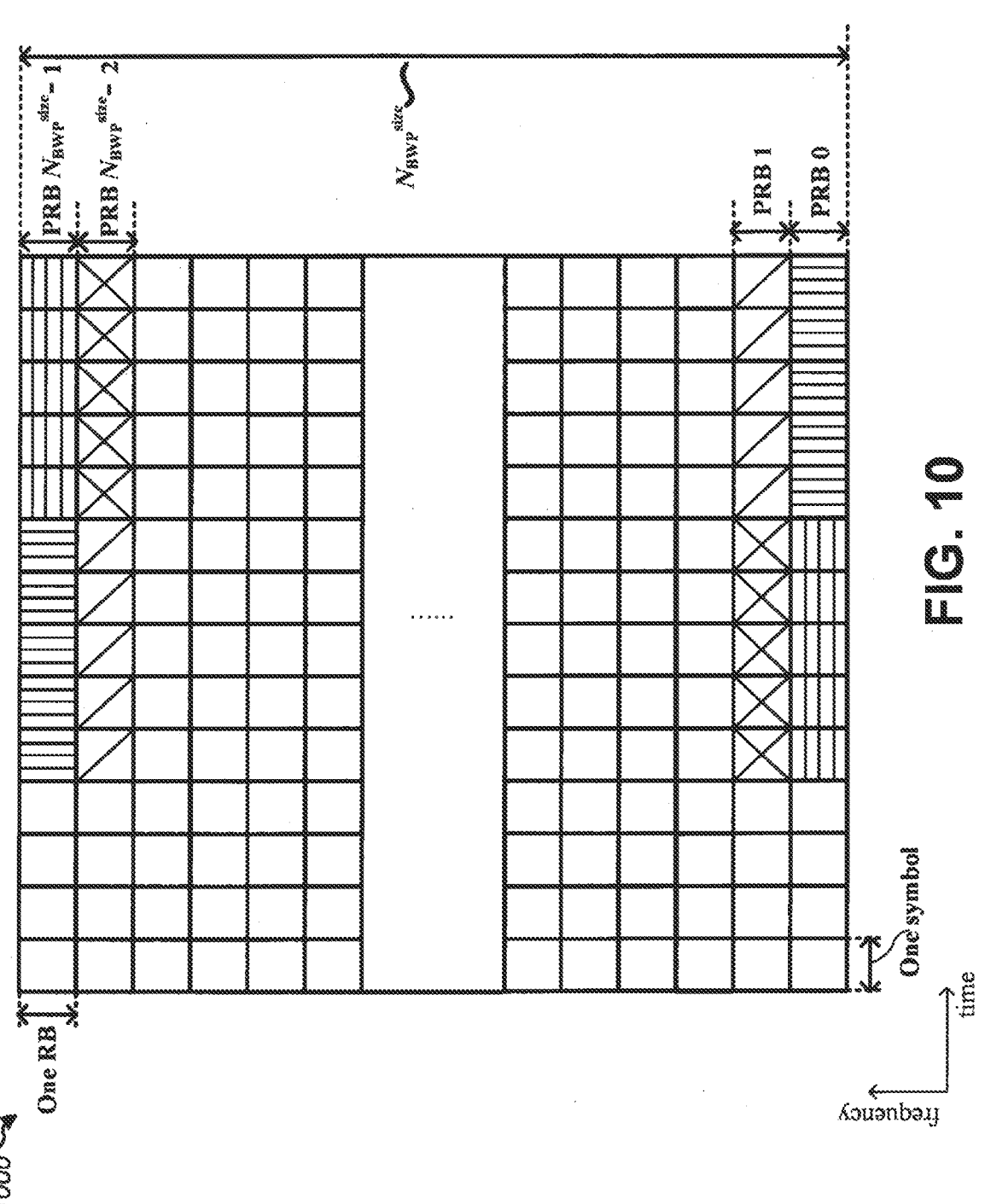
FIG. 10 is a diagram illustrating one example 1000 of how a cell-specific PUCCH resource is determined by a UE 102 and a base station 160.

FIG. 10 is a diagram illustrating one example 1000 of how a cell-specific PUCCH resource is determined by a UE 102 and a base station 160. As depicted in the FIG. 10, one box in the time domain represents one symbol. The total number of the symbols in the time domain is 14 symbols, which is a number of symbols within a slot. In the meantime, one box in the frequency domain represents one resource block (e.g. one PRB). The total number of the resource blocks in the frequency domain is the $N_{BWP}^{size}$, which is the size of the initial UL BWP.

In the FIG. 10, the RRC parameter pucch-ResourceCommon is set to 8. That is, the row with index 8 of Table 900 is used to provide or configure a PUCCH resource set. In other words, a PUCCH resource set is provided by the RRC parameter pucch-ResourceCommon. The PUCCH resource set can be also referred to as a cell specific PUCCH resource set. The PUCCH resource set includes a plurality of PUCCH resources, for example, sixteen PUCCH resources. The UE 102 may determine a PUCCH resource set for PUCCH transmission in the initial UL BWP of $N_{BWP}^{size}$ PRBs at least based on the RRC parameter pucch-ResourceCommon and the predefined table associated to the cell specific PUCCH resource configuration.

According to the row with index 8 of Table 900, the UE 102 may be provided one PUCCH resource configuration relating to PUCCH format, first symbol, number of symbols, PRB offset, and set of initial CS indexes. To be specific, PUCCH format configured for the PUCCH resources included in the PUCCH resource set is PUCCH format 1. In time domain, each PUCCH resource is configured with 10 symbols and starts from the fifth symbol relative to the first symbol of a slot. That is, the first symbol of each PUCCH resource is a fifth symbol within a slot. PRB offset, i.e. $RB_{BWP}^{offset}=0$, is used to determine the frequency location of PUCCH resources included in the PUCCH resource set. The PRB offset $RB_{BWP}^{offset}$ indicates an offset in PRBs relative to PRB0 of the initial UL BWP. $RB_{BWP}^{offset}=0$ means some PUCCH resources are configured in the PRB0 of the initial UL BWP. That is, PRB index for PUCCH resource(s) with certain index(es) is PRB0 of the initial UL BWP. Different PUCCH resources may have different frequency locations (PRB indexes). PRB index of one PUCCH resource may be different from that for another PUCCH resource. Since frequency hopping is used for PUCCH transmission, one PUCCH resource is divided into two hops, i.e. the first hop and the second hop. The frequency offset (frequency distance) between two hops of one PUCCH resource for PUCCH transmission may be configured as large as possible, which can harvest frequency diversity gain as much as possible and can avoid the fragmentation of data transmission. In the present disclosure, two hops of one PUCCH resource may be configured on two edges of the initial UL BWP. To be specific, one hop of one PUCCH resource may be configured on one edge of the initial UL BWP. On the other hand, the other hop of the PUCCH resource may be configured on the other edge of the initial UL BWP.

According to PUCCH configuration(s) provided by a row of Table 900, the UE 102 may determine time and frequency resources assigned to a PUCCH resource set by the base station 160. As showed in the FIG. 10, the time and frequency resource assigned to the PUCCH resource set can be further divided into four sets of time and frequency resources, i.e. a set of boxes marked (drew) with horizontal lines, a set of boxes marked with vertical lines, a set of boxes marked with cross, a set of boxes marked with diagonal lines. As above-mentioned, the PUCCH resource set includes sixteen PUCCH resources which can be indexed from 0 to 15. The PUCCH resource index can be denoted as $r_{PUCCH}$ where $0 \leq r_{PUCCH} \leq 15$. Therefore, each set of time and frequency resources includes four PUCCH resources.

For PUCCH resource with index $r_{PUCCH}$ where $0 \leq r_{PUCCH} \leq 7$, the UE 102 may determine PRB index of the PUCCH resources in the first hop as $RB_{BWP}^{offset}$+floor $(r_{PUCCH}/N_{CS})$ and may determine PRB index of the PUCCH resources in the second hop as $N_{BWP}^{size}-1-RB_{BWP}^{offset}-$floor$(r_{PUCCH}/N_{CS})$. $N_{CS}$ is the total number of initial cyclic shift indexes in the set of initial cyclic shift indexes {0, 3, 6, 9}, i.e. $N_{CS}=4$. For PUCCH resources with index $r_{PUCCH}$ where $0 \leq r_{PUCCH} \leq 3$, the PRB index of these PUCCH resources in the first hop is PRB 0 of the initial UL BWP, i.e. the boxes marked with horizontal lines in the bottom of the FIG. 10. On the other hand, for PUCCH resources with index $r_{PUCCH}$ where $0 \leq r_{PUCCH} \leq 3$, the PRB index of these PUCCH resources in the second hop is PRB $N_{BWP}^{size}-1$ of the initial UL BWP, i.e. the boxes marked with horizontal lines in the top of the FIG. 10. For PUCCH resources with index $r_{PUCCH}$ where $4 \leq r_{PUCCH} \leq 7$, the PRB index of these PUCCH resources in the first hop is PRB 1 of the initial UL BWP, i.e. the boxes marked with cross in the bottom of the FIG. 10. On the other hand, for PUCCH resources with index $r_{PUCCH}$ where $4 \leq r_{PUCCH} \leq 7$, the PRB index of these PUCCH resources in the second hop is PRB $N_{BWP}^{size}-2$ of the initial UL BWP, i.e. the boxes marked with cross in the top of the FIG. 10.

For PUCCH resource with index $r_{PUCCH}$ where $8 \leq r_{PUCCH} \leq 15$, the UE 102 may determine PRB index of the PUCCH resources in the first hop as $N_{BWP}^{size}-1-$ $RB_{BWP}^{offset}-$floor$((r_{PUCCH}-8)/N_{CS})$ and may determine PRB index of the PUCCH resources in the second hop as $RB_{BWP}^{offset}+$floor$((r_{PUCCH}-8)/N_{CS})$. For PUCCH resources with index $r_{PUCCH}$ where $8 \leq r_{PUCCH} \leq 11$, the PRB index of these PUCCH resources in the first hop is PRB $N_{BWP}^{size}-1$ of the initial UL BWP, i.e. the boxes marked with vertical lines in the top of the FIG. 10. On the other hand, for PUCCH resources with index $r_{PUCCH}$ where $8 \leq r_{PUCCH} \leq 11$, the PRB index of these PUCCH resources in the second hop is PRB 0 of the initial UL BWP, i.e. the boxes marked with vertical lines in the bottom of the FIG. 10. For PUCCH resources with index $r_{PUCCH}$ where $12 \leq r_{PUCCH} \leq 15$, the PRB index of these PUCCH resources in the first hop is PRB $N_{BWP}^{size}-2$ of the initial UL BWP, i.e. the boxes marked with diagonal lines in the top of the FIG. 10. On the other hand, for PUCCH resources with index $r_{PUCCH}$ where $12 \leq r_{PUCCH} \leq 15$, the PRB index of these PUCCH resources in the second hop is PRB 1 of the initial UL BWP, i.e. the boxes marked with diagonal lines in the bottom of the FIG. 10.

For those PUCCH resources assigned in same time and frequency resources, different cyclic shift indexes among the set of initial cyclic shift indexes are used. That is, initial cyclic shift indexes can be used to distinguish each other. The total number of initial cyclic shift indexes in the set of initial cyclic shift indexes, i.e. $N_{CS}$, determines how many PUCCH resources can be assigned within a same time and frequency resource. For PUCCH resource with index $r_{PUCCH}$ where $0 \leq r_{PUCCH} \leq 7$, the UE 102 may determine the initial cyclic shift index in the set of initial cyclic shift indexes according to $r_{PUCCH}$ mod $N_{CS}$. That is, for a PUCCH resource with index $r_{PUCCH}$ where $0 \leq r_{PUCCH} \leq 7$, the UE 102 may determine the location of the initial cyclic shift index $L_{CS}$, $0 \leq L_{CS} < N_{CS}$, in the set of initial cyclic shift indexes as $r_{PUCCH}$ mod $N_{CS}$, i.e. $L_{CS}=r_{PUCCH}$ mod $N_{CS}$. An initial cyclic shift index with location $L_{CS}=0$ means the initial cyclic shift index is the first initial cyclic shift index in the set of initial cyclic shift indexes.

Similarly, for PUCCH resource with index $r_{PUCCH}$ where $8 \leq r_{PUCCH} \leq 15$, the UE 102 may determine the initial cyclic shift index in the set of initial cyclic shift indexes according to $(r_{PUCCH}-8)$ mod $N_{CS}$. That is, for a PUCCH resource with index $r_{PUCCH}$ where $8 \leq r_{PUCCH} \leq 15$, the UE 102 may determine the location of the initial cyclic shift index $L_{CS}$, $0 \leq L_{CS} \leq N_{CS}$, in the set of initial cyclic shift indexes as $(r_{PUCCH}-8)$ mod $N_{CS}$, i.e. $L_{CS}=(r_{PUCCH}-8)$ mod $N_{CS}$.

In response to reception of PDSCH scheduled by a DCI format, the UE 102 may provide HARQ-ACK information in a PUCCH transmission. As above-mentioned, the UE 102 determines a PUCCH resource set at least based on the RRC parameter pucch-ResourceCommon and the predefined table associated to the cell specific PUCCH resource configuration. After determining the PUCCH resource set, the UE 102 may determine a PUCCH resource (a PUCCH resource index $r_{PUCCH}$) from the PUCCH resource set for PUCCH transmission with the HARQ-ACK information. The UE may determine a PUCCH resource with index $r_{PUCCH}$ based on Formula (4) $r_{PUCCH}=$floor$(2 \times n_{CCE,0}/N_{CCE})+2 \times \Delta_{PRI}$. Here, $N_{CCE}$ is a number of CCEs in a CORESET where a PDCCH with the DCI format is detected. $n_{CCE,0}$ is the index of a first CCE for the PDCCH reception. $\Delta_{PRI}$ is a value of the PUCCH resource indicator (PRI) field in the DCI format scheduling the PDSCH. The UE 102 may transmit PUCCH with the HARQ-ACK information in the determined PUCCH resource with index $r_{PUCCH}$ in the initial UL BWP.

As above-mentioned, the UE 102 always transmits HARQ-ACK information in a cell specific PUCCH using frequency hopping to the base station 160. Two hops of one cell specific PUCCH would be transmitted on two edges of the initial UL BWP. In some scenarios, non-RedCap UEs can be configured by the base station 160 to operate with a wide UL BWP whose bandwidth can be up to the carrier bandwidth of a serving cell. Due to the reduced bandwidth of RedCap UEs, the RedCap UEs may be configured by the base station 160 to operate with a narrow initial UL BWP which may be confined within the wide UL BWP configured for non-RedCap UEs. Given the PUCCH transmission with frequency hopping in the narrow initial UL BWP, it would lead to a non-contiguous frequency resource in the wider UL BWP. That is, the base station 160 cannot allocate wide and contiguous frequency resource to a non-RedCap UE for PUSCH, which would reduce the uplink peak data rate of the non-RedCap UE and degrade the performance of the PUSCH transmission.

The PUCCH transmission with frequency hopping is beneficial to improve the PUCCH transmission reliability. On the other hand, the caused PUSCH resource fragmentation issue would also result in a degraded performance of PUSCH transmission for non-RedCap UEs. Therefore, compared with always transmitting a PUCCH with frequency hopping, solutions as like introducing PUCCH frequency hopping indication are beneficial for improving the performance of whole communication system performance and providing a more flexible and efficient communication.

Figure 11:
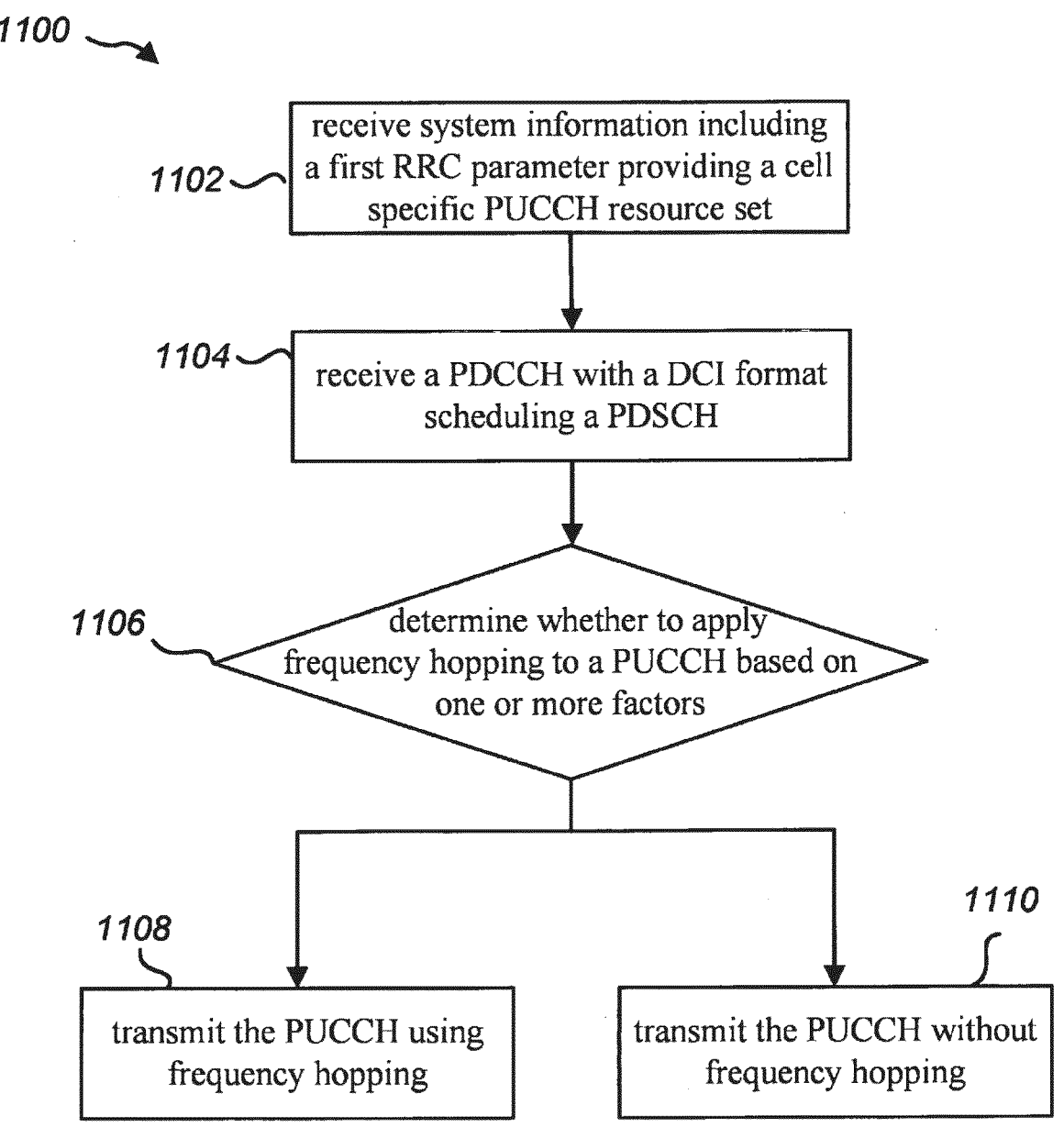
FIG. 11 is a flow diagram illustrating one implementation of a method 1100 for indicating PUCCH frequency hopping by a UE 102.

FIG. 11 is a flow diagram illustrating one implementation of a method 1100 for indicating PUCCH frequency hopping by a UE 102.

In the implementation of the present disclosure, indication of PUCCH frequency hopping is introduced to indicate the UE 102 whether to transmit a PUCCH using frequency hopping or not. The UE 102 may determine a PUCCH resource set at least based on cell specific parameters for PUCCH of the initial UL BWP and/or a predefined table related to cell specific PUCCH resource configuration(s), which are illustrated hereinafter. In the implementation of the present disclosure, the UE 102 may not have been configured dedicated PUCCH resource configuration(s). Therefore, the UE 102 may transmit a PUCCH with HARQ-ACK information in the cell specific PUCCH resource in the initial UL BWP and may not transmit a PUCCH with HARQ-ACK information in the UE specific PUCCH resource (i.e. dedicated PUCCH resource). In the implementation of the present disclosure, the UE 102 may be provided an initial UL BWP by initialUplinkBWP or initialUplinkBWP-redCap. In the implementation of the present disclosure, the UE 102 may perform PUCCH transmission with HARQ-ACK information in response to a PDSCH scheduled by DCI format 1_0 with CRC scrambled by a TC-RNTI. The implementation can be applied to either intra-slot frequency hopping and/or inter-slot frequency hopping of a PUCCH transmission.

The UE 102 may receive 1102, from a base station 160, system information including a first RRC parameter. The system information may be the SIB1. Or the system information may be other system information broadcasted by the base station 160. (e.g., MIB or other SIBs). The first RRC parameter is related to a first PUCCH resource set. Or, the first RRC parameter is related to a first cell specific PUCCH resource configuration. The first RRC parameter (e.g. the above-mentioned RRC parameter pucch-ResourceCommon) is a cell specific RRC parameter and may indicate an index corresponding to a row of a predefined table associated to cell specific PUCCH resource configuration(s). As above-mentioned, each row of the predefined table 900 provides a cell specific PUCCH resource configuration, i.e. a PUCCH resource set. Each cell specific PUCCH resource configuration includes information as PUCCH format, first (starting) symbol, number of symbols, PRB offset and set of initial CS indexes. In other words, each row of the predefined table 900 provides a PUCCH resource set. Therefore, the PUCCH resource set provided by a row of the table 900 indicated by the first RRC parameter is used for PUCCH transmission with HARQ-ACK information in the initial UL BWP. The HARQ-ACK information, for example, may be one HARQ-ACK information bit in response to PDSCH reception with the UE contention resolution identity. In other words, the first RRC parameter may configure or provide the UE 102 a first PUCCH resource set which may be used for transmission of HARQ-ACK information on a PUCCH in the initial UL BWP.

The first PUCCH resource set may include a plurality of cell specific PUCCH resources, for example, sixteen cell specific PUCCH resources. Each PUCCH resource corresponds to a PUCCH format, a first symbol, a duration, a PRB offset, and an initial cyclic shift index in a set of initial cyclic shift indexes. In other words, each PUCCH resource can be identified by at least a PUCCH format, a first (starting) symbol, a duration, a PRB offset, and an initial cyclic shift index in a set of initial cyclic shift indexes.

The UE 102 may receive 1104, from a base station 160, a PDCCH with a DCI format scheduling a PDSCH. In the implementation of the present disclosure, the DCI format herein may be a DCI format 1_0 with CRC scrambled by TC-RNTI. Additionally, the DCI format herein may refer to a DCI format which the UE 102 detected before the UE 102 is provided with dedicated PUCCH resource configuration(s) by base station 160. The UE 102 may transmit a PUCCH with HARQ-ACK information in response to the reception of the PDSCH. As above-mentioned, a PUCCH resource with $r_{PUCCH}$ can be determined by the UE 102 and the base station 160 for the PUCCH transmission with the HARQ-ACK information. The PUCCH resource is included in the first cell specific PUCCH resource set.

The UE 102 and/or the base station 160 may determine 1106, whether or not to transmit the PUCCH using frequency hopping based on one or more factors. To be specific, the UE 102 and/or the base station 160 may determine whether frequency hopping is applied to the PUCCH transmission based on one, more or all of a first DCI field of a first DCI format with CRC scrambled by a first RNTI, RRC parameter(s), a predefined rule, a MAC CE, the broadcasted system information, the transmitted preamble index, the PRACH resource where the preamble is transmitted, the RSRP of the selected SS/PBCH block, one or more RSRP thresholds. Here, the broadcasted system information may refer to a MIB, a SIB1, or other SIBs. The one or more RSRP thresholds can be indicated via the broadcasted system information. The RRC parameters(s) may be included in the broadcasted system information, e.g., SIB1, or other SIBs. The first RNTI can be a SI-RNTI, a RA-RNTI, or a TC-RNTI. The first DCI format can be a DCI format 1_0 or a DCI format 0_0. For example, the broadcasted system information may include a RRC parameter which can be used to indicate whether PUCCH frequency hopping is applied or not. A MAC CE herein may be a MAC CE included in a PDSCH scheduled by the format with CRC scrambled by the first RNTI.

In an example of the implementation, dynamic indication of PUCCH frequency hopping is introduced to indicate a UE 102 whether to transmit a PUCCH using frequency hopping or without frequency hopping. In other words, the UE 102 and/or the base station 160 may determine whether or not to transmit the PUCCH using frequency hopping based on a first DCI field of the first DCI format with CRC scrambled by the first RNTI. The base station 160 may use the first DCI field included in the first DCI format to indicate UE 102 whether to transmit a PUCCH using frequency hopping or without frequency hopping. The PUCCH with HARQ-ACK information in response to the reception of a PDSCH scheduled by the first DCI format is transmitted in the determined cell specific PUCCH resource with $r_{PUCCH}$.

In the example, the first DCI field may refer to a PUCCH frequency hopping flag field. The first DCI field can be termed 'a PUCCH frequency hopping flag field'. The current DCI format 1_0 in specification 38.212 does not include a first DCI field which can be used to indicate whether frequency hopping is applied to a PUCCH transmission or not. Therefore, a new DCI field with A bit(s) can be added as the first DCI field in the current DCI format 1_0. The new DCI field with A bit(s), i.e. the first DCI field can be added as a last DCI field of the DCI format 1_0. The new added first DCI field, i.e., the first DCI field, of the DCI format 1_0 is used to indicate whether or not frequency hopping is applied to a PUCCH transmission with HARQ-ACK information in response to a reception of a PDSCH scheduled by the DCI format 1_0.

Additionally or alternatively, instead of adding a new DCI field as the first DCI field, one or more bits of one current existing DCI field of the DCI format 1_0 can be used as the first DCI field. One current existing DCI field can be one of a frequency domain resource assignment field, a time domain resource assignment field, a VRB-to-PRB mapping field, a HARQ process number field, a Downlink assignment index field, a TPC command for scheduled PUCCH field, a PUCCH resource indicator field, and a PDSCH-to-HARQ feedback timing indicator field. In other words, A MSB (most significant bits) or LSB (least significant bits) bits of one current DCI field are used as the first DCI field to indicate whether frequency hopping is applied to a PUCCH transmission or not. In other words, the UE 102 and/or the base station 160 may interpret or determine A MSB or LSB bits of one current existing DCI field as the first DCI field and may interpret or determine the remaining bits of one current DCI field as the current existing DCI field. For example, the UE 102 and/or the base station 160 may interpret A MSB or LSB bits of the frequency domain resource assignment field as the first DCI field and may interpret the remaining bits of the frequency domain resource assignment field as for the frequency domain resource assignment field which is used for providing the frequency domain resource allocation of a PDSCH. Completely adding a new DCI field in the DCI format 1_0 would affect the common usage of the DCI format 1_0, especially considering the DCI format 1_0 is common for non-RedCap UEs and RedCap UEs. Therefore, reinterpreting some bits of the current existing DCI field would not change the DCI size of the DCI format 1_0 and would not affect the common usage of the DCI format 1_0, which is beneficial.

Additionally or alternatively, some DCI fields of the DCI format 1_0 which are no use for the UE 102 to perform a PUCCH transmission on a cell specific PUCCH resource can be used as the first DCI field. For a DCI format 1_0 with CRC scrambled by TC-RNTI, the Downlink assignment index field is reserved by the base station 160 and/or the UE 102. For a DCI format 1_0 with CRC scrambled by C-RNTI, although the Downlink assignment index field as a counter DAI is not reserved, the Downlink assignment index field is no use when the UE 102 performs a PUCCH transmission on a cell specific PUCCH resource. Basically, the UE 102 may transmit, on a cell specific PUCCH resource, a PUCCH with at most one HARQ-ACK information bit before the UE 102 is provided dedicated PUCCH resource and/or the UE 102 is provided a RRC parameter (e.g. pdsch-HARQ-ACK-Codebook) related to PDSCH HARQ-ACK codebook indication. For a DCI format 1_0 with CRC scrambled by C-RNTI, in a case that the UE 102 does not have dedicated PUCCH resource configuration provided by UE specific PUCCH parameter(s), the UE 102 and/or the base station 160 may interpret one or more bits of the Downlink assignment index field as the first DCI field. In a case that the UE 102 has dedicated PUCCH resource configuration provided by UE specific PUCCH parameter(s), the UE 102 and/or the base station 160 may not interpret one or more bits of the Downlink assignment index field as the first DCI field.

The UE 102 and/or the base station 160 may interpret A MSB or LSB bits of the Downlink assignment index field as the first DCI field and may interpret the remaining bits of the Downlink assignment index field as for the Downlink assignment index field. That is, A MSB or LSB bits of the Downlink assignment index field can be used to indicate whether frequency hopping is applied to a PUCCH transmission or not. Reusing one or more bits of one current existing DCI field of the DCI format 1_0 as the first DCI field would possibly harm the configuration flexibility given the size of the current existing DCI field is reduced. Therefore, reusing a reserved or no use DCI field would not affect the configuration flexibility, which is more beneficial.

The A bits mentioned above is a predetermined value. For example, the value of A may be equal to 1, 2, or another integer. As above-mentioned, the first DCI field can be termed 'a PUCCH frequency hopping flag field'. That is, the PUCCH frequency hopping flag field is used to indicate the UE 102 whether the PUCCH is transmitted with frequency hopping or without frequency hopping. In a case that the value of the PUCCH frequency hopping flag is set to a first value (e.g. '0'), the UE 102 may determine 1110 to transmit the PUCCH without frequency hopping in the initial UL BWP. In this case, the base station 160 may determine to receive the PUCCH without frequency hopping in the initial UL BWP. In a case that the value of the PUCCH frequency hopping flag is set to a second value (e.g. '1'), the UE 102 may determine 1108 to transmit the PUCCH using frequency hopping in the initial UL BWP. In this case, the base station 160 may determine to receive the PUCCH using frequency hopping in the initial UL BWP.

In an example of the implementation, a second RRC parameter is introduced to indicate the UE 102 whether to transmit the PUCCH using frequency hopping or not. The second RRC parameter (e.g., frequencyhopping-redcap) is a cell specific RRC parameter. The second RRC parameter is related to PUCCH frequency hopping indication. The second RRC parameter may be included in the broadcasted system information, for example, SIB1 or other SIBs. The UE 102 and/or the base station 160 may determine whether or not to transmit the PUCCH using frequency hopping based on the second RRC parameter. The base station 160 may use the second RRC parameter included in the system information to indicate UE 102 whether to transmit a PUCCH using frequency hopping or without frequency hopping.

The UE 102 may receive, from the base station 160, the system information (i.e. the broadcasted system information). In a case that the system information does not include the second RRC parameter, the UE 102 may determine 1110 to transmit the PUCCH without frequency hopping in the initial UL BWP. In this case, the base station 160 may determine to receive the PUCCH without frequency hopping in the initial UL BWP. In a case that the system information includes the second RRC parameter, the UE 102 may determine 1108 to transmit the PUCCH using frequency hopping in the initial UL BWP. In this case, the base station 160 may determine to receive the PUCCH using frequency hopping in the initial UL BWP.

In an example of the implementation, a third RRC parameter is introduced to indicate the UE 102 whether to transmit the PUCCH using frequency hopping or not. The third RRC parameter is a cell specific RRC parameter. The third RRC parameter is related to initial UL BWP configuration. The third RRC parameter may be included in the broadcasted system information, for example, SIB1 or other SIBs. The UE 102 and/or the base station 160 may determine whether or not to transmit the PUCCH using frequency hopping based on the third RRC parameter. The base station 160 may use the third RRC parameter included in the system information to indicate UE 102 whether to transmit a PUCCH using frequency hopping or without frequency hopping.

The UE 102 may receive, from the base station 160, the system information (i.e. the broadcasted system information). In a case that the system information does not include the third RRC parameter, the UE 102 may determine 1110 to transmit the PUCCH without frequency hopping in the initial UL BWP. In this case, the base station 160 may determine to receive the PUCCH without frequency hopping in the initial UL BWP. In a case that the system information includes the third RRC parameter, the UE 102 may determine 1108 to transmit the PUCCH using frequency hopping in the initial UL BWP. In this case, the base station 160 may determine to receive the PUCCH using frequency hopping in the initial UL BWP.

The third RRC parameter can be the RRC parameter initialUplinkBWP-redCap as above-mentioned. In a case that the system information includes the initialUplinkBWP and does not include the initialUplinkBWP-redCap, the UE 102 may determine 1108 to transmit the PUCCH using frequency hopping in the initial UL BWP. In a case that the system information includes the initialUplinkBWP-redCap, the UE 102 may determine 1108 to transmit the PUCCH without frequency hopping in the initial UL BWP. In other words, in a case that the UE 102 is provided an initial UL BWP by initialUplinkBWP, the UE 102 may determine to transmit the PUCCH using frequency hopping. In a case that the UE 102 is provided an initial UL BWP by initialUplinkBWP-redCap, the UE 102 may determine to transmit the PUCCH without frequency hopping.

In a case that frequency location and bandwidth of an initial UL BWP is provided by a fourth RRC parameter specifying a first frequency location and a first bandwidth included in the system information, the UE 102 may determine to transmit the PUCCH using frequency hopping. In a case that frequency location and bandwidth of an initial UL BWP is provided by the third RRC parameter specifying a second frequency location and a second bandwidth included in the system information, the UE 102 may determine to transmit the PUCCH without frequency hopping. Herein, the third RRC parameter is the locationAndBandwidth included in the initialUplinkBWP-redCap, while the fourth RRC parameter is the locationAndBandwidth included in the initialUplinkBWP. Additionally or alternatively, the third RRC parameter is the initialUplinkBWP-redCap, while the fourth RRC parameter is the initialUplinkBWP. Additionally or alternatively, the third RRC parameter is the locationAndBandwidth-redCap included in the initialUplinkBWP, while the fourth RRC parameter is the locationAndBandwidth included in the initialUplinkBWP That is, the initialUplinkBWP may include both the locationAndBandwidth and the locationAndBandwidth-redCap. In this case, the UE 102 may ignore the locationAndBandwidth and apply locationAndBandwidth-redCap to determine the frequency location and bandwidth of the initial UL BWP. As same as locationAndBandwidth, the locationAndBandwidth-redCap indicates a value which is interpreted as resource indicator value (RIV) corresponding to an offset (an starting resource block) $RB_{start}$ and a length $L_{RB}$ in terms of contiguously resource blocks.

In an example of the implementation, a fifth RRC parameter is introduced to indicate the UE 102 whether to transmit the PUCCH using frequency hopping or not. The fifth RRC parameter is a cell specific RRC parameter. The fifth RRC parameter is related to a cell specific PUCCH resource set. The fifth RRC parameter may be pucch-ResourceCommon-redCap included in the initialUplinkBWP. As same as pucch-ResourceCommon, the pucch-ResourceCommon-redCap indicates an index corresponding to a row of the predefined table 900 associated to cell specific PUCCH resource configuration(s). The indicated row of the predefined table 900 provides a cell specific PUCCH resource configuration including information as PUCCH format, first (starting) symbol, number of symbols, PRB offset and set of initial CS indexes for a second PUCCH resource set. Therefore, the pucch-ResourceCommon-redCap may also configure or provide the UE 102 a cell specific PUCCH resource set (or a cell specific PUCCH resource configuration) for PUCCH transmission in the initial UL BWP. Therefore, the initialUplinkBWP may include both the pucch-Resource-Common and pucch-ResourceCommon-redCap. In this case, the UE 102 may ignore the pucch-ResourceCommon and apply pucch-ResourceCommon-redCap to determine the cell specific PUCCH resource set which is used for transmission of HARQ-CK information on PUCCH in the initial UL BWP.

The UE 102 and/or the base station 160 may determine whether or not to transmit the PUCCH using frequency hopping based on the fifth RRC parameter. The base station 160 may use the fifth RRC parameter included in the system information to indicate UE 102 whether to transmit a PUCCH using frequency hopping or without frequency hopping. In a case that the system information includes the fifth RRC parameter, the UE 102 may determine to transmit the PUCCH without frequency hopping in the initial UL BWP. In this case, the base station 160 may determine to receive the PUCCH without frequency hopping in the initial UL BWP. In a case that the system information does not include the fifth RRC parameter, the UE 102 may determine to transmit the PUCCH using frequency hopping in the initial UL BWP. In this case, the base station 160 may determine to receive the PUCCH using frequency hopping in the initial UL BWP.

In an example of the implementation, predefined rules are introduced to indicate the UE 102 whether to transmit the PUCCH using frequency hopping or not. One predefined rule is such that each PUCCH resource included in the cell-specific PUCCH resource set is predefined with a rule related to whether PUCCH frequency hopping is used or not. In other words, each PUCCH resource included in the cell specific PUCCH resource set is predefined with a respective indication of whether PUCCH frequency hopping is applied (or enabled) to the PUCCH resource or not. Additionally, each PUCCH resource included in the cell specific PUCCH resource set can be associated to a respective indication of whether PUCCH frequency hopping is applied (or enabled) to the PUCCH resource or not. In a case that a PUCCH resource determined for a PUCCH transmission is indicated as that PUCCH frequency hopping is enabled to the PUCCH resource, the UE 102 may determine to perform the PUCCH transmission using frequency hopping. In a case that a PUCCH resource determined for a PUCCH transmission is indicated as that PUCCH frequency hopping is disabled to the PUCCH resource, the UE 102 may determine to perform the PUCCH transmission without frequency hopping.

Additionally or alternatively, one predefined rule is such that the cell-specific PUCCH resource set is predefined with a rule related to whether PUCCH frequency hopping is used or not. That is, the cell specific PUCCH resource set is predefined with an indication of whether PUCCH frequency hopping is applied (or enabled). As above-mentioned, the table 900 contains 16 rows(entries) where each row provides a cell specific PUCCH resource set. Each cell specific PUCCH resource set is associated to a respective indication of whether PUCCH frequency hopping is applied (or enabled) to the PUCCH resource set or not. In a case that a PUCCH resource set provided by pucch-ResourceCommon is indicated as that PUCCH frequency hopping is enabled to the PUCCH resource set, the UE 102 may determine to perform a PUCCH transmission using frequency hopping regardless of which PUCCH resource of the PUCCH resource set is used for the PUCCH transmission. In a case that a PUCCH resource set provided by pucch-Resource-Common is indicated as that PUCCH frequency hopping is disabled to the PUCCH resource set, the UE 102 may determine to perform a PUCCH transmission without frequency hopping regardless of which PUCCH resource of the PUCCH resource set is used for the PUCCH transmission. Indications related to whether PUCCH frequency hopping is used or not as illustrated in the example of the implementation can be notified by the base station via RRC parameters included in the system information, for example, SIB1, or can be predefined in the Table 900.

Additionally or alternatively, the UE 102 and/or the base station 160 may determine whether frequency hopping is applied to the PUCCH transmission based on the PUCCH resource indicator (PRI) field. The UE 102 and/or the base station 160 may determine whether frequency hopping is applied to the PUCCH transmission according to the value of the PRI field, i.e. $\Delta_{PRI}$. If the value $\Delta_{PRI}$ is such that $0 \leq \Delta_{PRI} \leq 3$, the UE 102 and/or the base station 160 may determine frequency hopping is applied to the PUCCH transmission. If the value $\Delta_{PRI}$ is such that $4 \leq \Delta_{PRI} \leq 7$, the UE 102 and/or the base station 160 may determine frequency hopping is not applied to the PUCCH transmission. Or, if the value $\Delta_{PRI}$ is such that $0 \leq \Delta_{PRI} \leq 3$, the UE 102 and/or the base station 160 may determine frequency hopping is not applied to the PUCCH transmission. If the value $\Delta_{PRI}$ is such that $4 \leq \Delta_{PRI} \leq 7$, the UE 102 and/or the base station 160 may determine frequency hopping is applied to the PUCCH transmission. If the value $\Delta_{PRI}$ is set to even numbers, e.g., 0, 2, 4, 6, the UE 102 and/or the base station 160 may determine frequency hopping is applied to the PUCCH transmission. If the value $\Delta_{PRI}$ is set to odd numbers, e.g., 1, 3, 5, 7, the UE 102 and/or the base station 160 may determine frequency hopping is not applied to the PUCCH transmission. Or, if the value $\Delta_{PRI}$ is set to even numbers, e.g., 0, 2, 4, 6, the UE 102 and/or the base station 160 may determine frequency hopping is not applied to the PUCCH transmission. If the value $\Delta_{PRI}$ is set to odd numbers, e.g., 1, 3, 5, 7, the UE 102 and/or the base station 160 may determine frequency hopping is applied to the PUCCH transmission.

The determination of a PUCCH resource (i.e. the determination of $r_{PUCCH}$) from the cell specific PUCCH resource set for a PUCCH transmission in the initial UL BWP is illustrated as above-mentioned. The same determination of the PUCCH resource (i.e. the determination of $r_{PUCCH}$) for a PUCCH transmission can be applied to various implementations of the present disclosure as well. Furthermore, the existing determination method of a PRB index of the determined PUCCH resource with $r_{PUCCH}$ as above-mentioned can be also applied to various implementations of the present disclosure. However, there is one issue that the existing determination method of a PRB index of a PUCCH resource with $r_{PUCCH}$ cannot be applied to determine a PRB index of a PUCCH resource where frequency hopping is not performed. In other words, the existing determination method of a PRB index of a PUCCH resource with $r_{PUCCH}$ can be only applied to determine the PRB index of a PUCCH resource where frequency hopping is performed. Therefore, a new determination method of a PRB index of a PUCCH resource with $r_{PUCCH}$ should be introduced for the case that a PUCCH transmission is performed without frequency hopping, which is beneficial for the communication system.

FIG. 12 is a flow diagram illustrating one implementation of a method 1200 for determining PRB index of a PUCCH transmission without frequency hopping by a UE 102.

In the implementation of the present disclosure, determination of PRB index of a PUCCH transmission is illustrated when frequency hopping is not performed for the PUCCH transmission. In the implementation of the present disclosure, the UE 102 may determine a PUCCH resource set at least based on a cell specific parameter for PUCCH of the initial UL BWP and/or a predefined table 900 related to cell specific PUCCH resource configuration(s). In the implementation of the present disclosure, the UE 102 may not have been configured dedicated PUCCH resource configuration(s). Therefore, the UE 102 may transmit a PUCCH with HARQ-ACK information in the cell specific PUCCH resource in the initial UL BWP and may not transmit a PUCCH with HARQ-ACK information in the UE specific PUCCH resource (i.e. dedicated PUCCH resource). In the implementation of the present disclosure, the UE 102 may be provided an initial UL BWP by initialUplinkBWP or initialUplinkBWP-redCap. In the implementation of the present disclosure, the UE 102 may perform PUCCH transmission with HARQ-ACK information in response to a PDSCH scheduled by DCI format 1_0 with CRC scrambled by a TC-RNTI.

The UE 102 may receive 1202, from a base station 160, system information including a first RRC parameter. The system information may be the SIB1. Or the system information may be other system information broadcasted by the base station 160. (e.g., MIB or other SIBs). The first RRC parameter is related to a first PUCCH resource set. Or, the first RRC parameter is related to a first cell specific PUCCH resource configuration. The first RRC parameter (e.g. the above-mentioned RRC parameter pucch-ResourceCommon) is a cell specific RRC parameter and may indicate an index corresponding to a row of a predefined table associated to cell specific PUCCH resource configuration(s). As above-mentioned, each row of the predefined table 900 provides a cell specific PUCCH resource configuration, i.e. a PUCCH resource set. Each cell specific PUCCH resource configuration includes information as PUCCH format, first (starting) symbol, number of symbols, PRB offset and set of initial CS indexes. In other words, each row of the predefined table 900 provides a PUCCH resource set. Therefore, the PUCCH resource set provided by a row of the table 900 indicated by the first RRC parameter is used for PUCCH transmission with HARQ-ACK information in the initial UL BWP. The HARQ-ACK information, for example, may be one HARQ-ACK information bit in response to PDSCH reception with the UE contention resolution identity. In other words, the first RRC parameter may configure or provide the UE 102 a first PUCCH resource set which may be used for transmission of HARQ-ACK information on a PUCCH in the initial UL BWP.

The UE 102 may receive 1204, from a base station 160, a PDCCH with a DCI format scheduling a PDSCH. In the implementation of the present disclosure, the DCI format herein may be a DCI format 1_0 with CRC scrambled by TC-RNTI. Additionally, the DCI format herein may refer to a DCI format which the UE 102 detected before the UE 102 is provided with dedicated PUCCH resource configuration(s) by base station 160. The UE 102 may transmit a PUCCH with HARQ-ACK information in response to the reception of the PDSCH scheduled by the DCI format. As above-mentioned, a PUCCH resource with $r_{PUCCH}$ can be determined by the UE 102 and the base station 160 for the PUCCH transmission with the HARQ-ACK information. The PUCCH resource is included in the first cell specific PUCCH resource set. In the implementation of the present disclosure, the UE 102 and/or the base station 160 may determine that the PUCCH frequency hopping is not performed for the PUCCH transmission. That is, the UE 102 may perform, on a PUCCH resource of the cell specific PUCCH resource set in an initial UL BWP, a PUCCH transmission without frequency hopping. The base station 160 may receive the PUCCH transmission without frequency hopping on the PUCCH resource of the cell specific PUCCH resource set in the initial UL BWP. The conditions (or factors) which are used to determine that the PUCCH frequency hopping is not performed for the PUCCH transmission are illustrated in the above-mentioned implementation of the present disclosure.

The UE 102 and/or the base station 160 may determine 1206 that, whether a PRB index of the PUCCH transmission is determined based on a size of the initial UL BWP or not based on a size of the initial UL BWP is determined based on a sixth RRC parameter. That is, the sixth RRC parameter is used to indicate the UE 102 how to determine (or calculate) the PRB index of the PUCCH transmission. In other words, the sixth RRC parameter is used to indicate the UE 102 whether the size of the initial UL BWP is used to determine the PRB index of the PUCCH transmission or not. In other words, the sixth RRC parameter is used to indicate the UE 102 whether the PUCCH resources used for the PUCCH transmission locate in the bottom of the initial UL BWP or in the top of the initial UL BWP in the frequency domain.

In a case that the system information does not include the sixth RRC parameter, 1210 the PRB index of a PUCCH transmission is determined not based on the size of the initial UL BWP. To be specific, the UE 102 and/or the base station 160 may determine the PRB index of the PUCCH transmission as $RB_{BWP}^{offset}+\text{floor}(r_{PUCCH}/N_{CS})$. That is, in this case, for a PUCCH resource with index $r_{PUCCH}$, the PRB index of the PUCCH transmission is determined as like $RB_{BWP}^{offset}+\text{floor}(r_{PUCCH}/N_{CS})$. In other words, in a case that the system information does not include the sixth RRC parameter, the PRB index of the PUCCH transmission is determined based on the PRB offset $RB_{BWP}^{offset}$, the PUCCH resource index $r_{PUCCH}$, and $N_{CS}$ which is the total number of initial cyclic shift indexes in the set of initial cyclic shift indexes. As above-mentioned, the PRB offset $RB_{BWP}^{offset}$ and $N_{CS}$ is provided by the first RRC parameter.

In a case that the system information includes the sixth RRC parameter, 1208 the PRB index of a PUCCH transmission is determined based on the size of the initial UL BWP. To be specific, the UE 102 and/or the base station 160 may determine the PRB index of the PUCCH transmission as $N_{BWP}^{size}-1-RB_{BWP}^{offset}-\text{floor}(r_{PUCCH}/N_{CS})$. That is, in this case, for a PUCCH resource with index $r_{PUCCH}$, the PRB index of the PUCCH transmission is determined as like $N_{BWP}^{size}-1-RB_{BWP}^{offset}-\text{floor}(r_{PUCCH}/N_{CS})$. In other words, in a case that the system information includes the sixth RRC parameter, the PRB index of the PUCCH transmission is determined based on the size of initial UL BWP $N_{BWP}^{size}$, the PRB offset $RB_{BWP}^{offset}$, the PUCCH resource index $r_{PUCCH}$, and $N_{CS}$ which is the total number of initial cyclic shift indexes in the set of initial cyclic shift indexes.

Additionally or alternatively, the sixth RRC parameter can be set to either 'a first particular value' or 'a second particular value'. In a case that the sixth RRC parameter is set to 'a first particular value' (e.g., 'bottom'), 1210 the PRB index of a PUCCH transmission is determined not based on the size of the initial UL BWP. To be specific, the UE 102 and/or the base station 160 may determine the PRB index of the PUCCH transmission as $RB_{BWP}^{offset}+\text{floor}(r_{PUCCH}/N_{CS})$. That is, in this case, for a PUCCH resource with index $r_{PUCCH}$, the PRB index of the PUCCH transmission is determined as like $RB_{BWP}^{offset}+\text{floor}(r_{PUCCH}/N_{CS})$. In other words, in a case that the sixth RRC parameter is set to 'a first value' (e.g., 'bottom'), the PRB index of the PUCCH transmission is determined based on the PRB offset $RB_{BWP}^{offset}$, the PUCCH resource index $r_{PUCCH}$, and $N_{CS}$ which is the total number of initial cyclic shift indexes in the set of initial cyclic shift indexes. As above-mentioned, the PRB offset $RB_{BWP}^{offset}$ and $N_{CS}$ is provided by the first RRC parameter.

In a case that the sixth RRC parameter is set to 'a second particular value' (e.g., 'top'), 1208 the PRB index of a PUCCH transmission is determined based on the size of the initial UL BWP. To be specific, the UE 102 and/or the base station 160 may determine the PRB index of the PUCCH transmission as $N_{BWP}^{size}-1-RB_{BWP}^{offset}-\text{floor}(r_{PUCCH}/N_{CS})$. That is, in this case, for a PUCCH resource with index $r_{PUCCH}$, the PRB index of the PUCCH transmission is determined as like $N_{BWP}^{size}-1-RB_{BWP}^{offset}-\text{floor}(r_{PUCCH}/N_{CS})$. In other words, in a case that the sixth RRC parameter is set to 'a first particular value' (e.g., 'top'), the PRB index of the PUCCH transmission is determined based on the size of initial UL BWP $N_{BWP}^{size}$, the PRB offset $RB_{BWP}^{offset}$, the PUCCH resource index $r_{PUCCH}$, and $N_{CS}$ which is the total number of initial cyclic shift indexes in the set of initial cyclic shift indexes.

In the implementation of the present disclosure, the UE 102 and the base station 160 may determine the initial cyclic shift index in the set of initial cyclic shift indexes as $(r_{PUCCH}) \mod (N_{CS})$ for a PUCCH resource with index $r_{PUCCH}$. That is, regardless of whether the value of $r_{PUCCH}$ is larger than 8 or not, the initial cyclic shift index for a PUCCH resource with index $r_{PUCCH}$ is always determined as $(r_{PUCCH}) \mod (N_{CS})$.

According to the implementation of the present disclosure, a PRB index of a PUCCH resource where frequency hopping is not performed can be determined. The determination of PRB index of a PUCCH transmission without frequency hopping can provide a more efficient resource utilization.

In the various implementations of the present disclosure, the frequency hopping can refer to either intra-slot frequency hopping of a PUCCH transmission or inter-slot frequency hopping of a PUCCH transmission. In the present disclosure, the UE 102 and/or the base station 160 may determine which frequency hopping type is applied to the PUCCH based on RRC parameters included in the broadcasted system information and/or a DCI field included in the first DCI format. For example, a RRC parameter included in the broadcasted system information (e.g., SIB1) can be used to indicate the UE 102 whether the intra-slot frequency hopping is enabled or the inter-slot frequency hopping is enabled. For example, a value of a field in the first DCI format with CRC scrambled by the first RNTI can be used to indicate which frequency hopping type is applied to the PUCCH transmission. In a case that the value of the field is set to a first value (e.g., 0), the UE 102 and/or the base station 160 may determine intra-slot frequency hopping is applied. In a case that the value of the field is set to a second value (e.g., 1), the UE 102 and/or the base station 160 may determine inter-slot frequency hopping is applied. The UE 102 and/or the base station 160 may determine the inter-slot frequency hopping for PUCCH transmission with repetitions. On the other hand, the UE 102 and/or the base station 160 may determine the intra-slot frequency hopping for PUCCH transmission without repetitions. In a case that the intra-slot frequency hopping is applied or enabled, 'the UE 102 transmits a PUCCH using frequency hopping' means 'the UE 102 transmits a PUCCH using intra-slot frequency hopping'. In a case that the inter-slot frequency hopping is applied or enabled, 'the UE 102 transmits a PUCCH using frequency hopping' means 'the UE 102 transmits a PUCCH using inter-slot frequency hopping in one or multiple different slots'.

In the various implementation of the present disclosure, duration of the PUCCH within a slot can be denoted as $N_{symb}^{PUCCH}$. In a case that the intra-slot frequency hopping is enabled, the UE 102 may perform frequency hopping for PUCCH transmission. That is, the UE 102 may perform the PUCCH transmission in the first hop and the second hop in one slot. The number of symbols in the first hop is given by floor($N_{symb}^{PUCCH}/2$). That is, in a slot where the PUCCH is transmitted, the first floor($N_{symb}^{PUCCH}/2$) symbol(s) of PUCCH transmission with allocated duration $N_{symb}^{PUCCH}$ are symbol(s) in the first hop. While the number of symbols in the second hop is given by $N_{symb}^{PUCCH}$–floor($N_{symb}^{PUCCH}/2$), i.e. ceiling($N_{symb}^{PUCCH}/2$). That is, in a slot where the PUCCH is transmitted, the last ceiling($N_{symb}^{PUSCH}/2$) symbol(s) of PUCCH transmission with allocated duration $N_{symb}^{PUCCH}$ are symbol(s) in the second hop.

In a case that the inter-slot frequency hopping is enabled, the UE 102 may perform frequency hopping for PUCCH transmission across slots. Herein, the UE 102 may perform PUCCH transmission repetitions across slots, i.e. multi-slot PUCCH transmission. Same symbol allocation (i.e. the starting symbol and the allocated duration for the PUCCH) is applied across slots. For convenience, for one PUCCH transmission among the multi-slot PUCCH transmission which is transmitted in a slot with slot number $n_s^\mu$, if $n_s^\mu$ mod 2=0, the PUCCH transmission may refer to one first hop of the multi-slot PUCCH transmission. On the other hand, for one PUCCH transmission among the multi-slot PUCCH transmission which is transmitted in a slot with slot number $n_s^\mu$, if $n_s^\mu$ mod 2=1, the PUCCH transmission may refer to one second hop of the multi-slot PUCCH transmission. Therefore, if the PUCCH transmission with HARQ-ACK information in response to a PDSCH scheduled by DCI format 1_0 with CRC scrambled by a TC-RNTI is repeated across more than two slots, the multi-slot PUCCH transmission may consist of more than one first hop and more than one second hop.

Unless specified, a first hop throughout the present disclosure may refer to either a first hop for intra-slot frequency hopping or a first hop for inter-slot frequency hopping.

Similarly, a second hop hereinafter may refer to either a second hop for intra-slot frequency hopping or a second hop for inter-slot frequency hopping.

Figure 13:
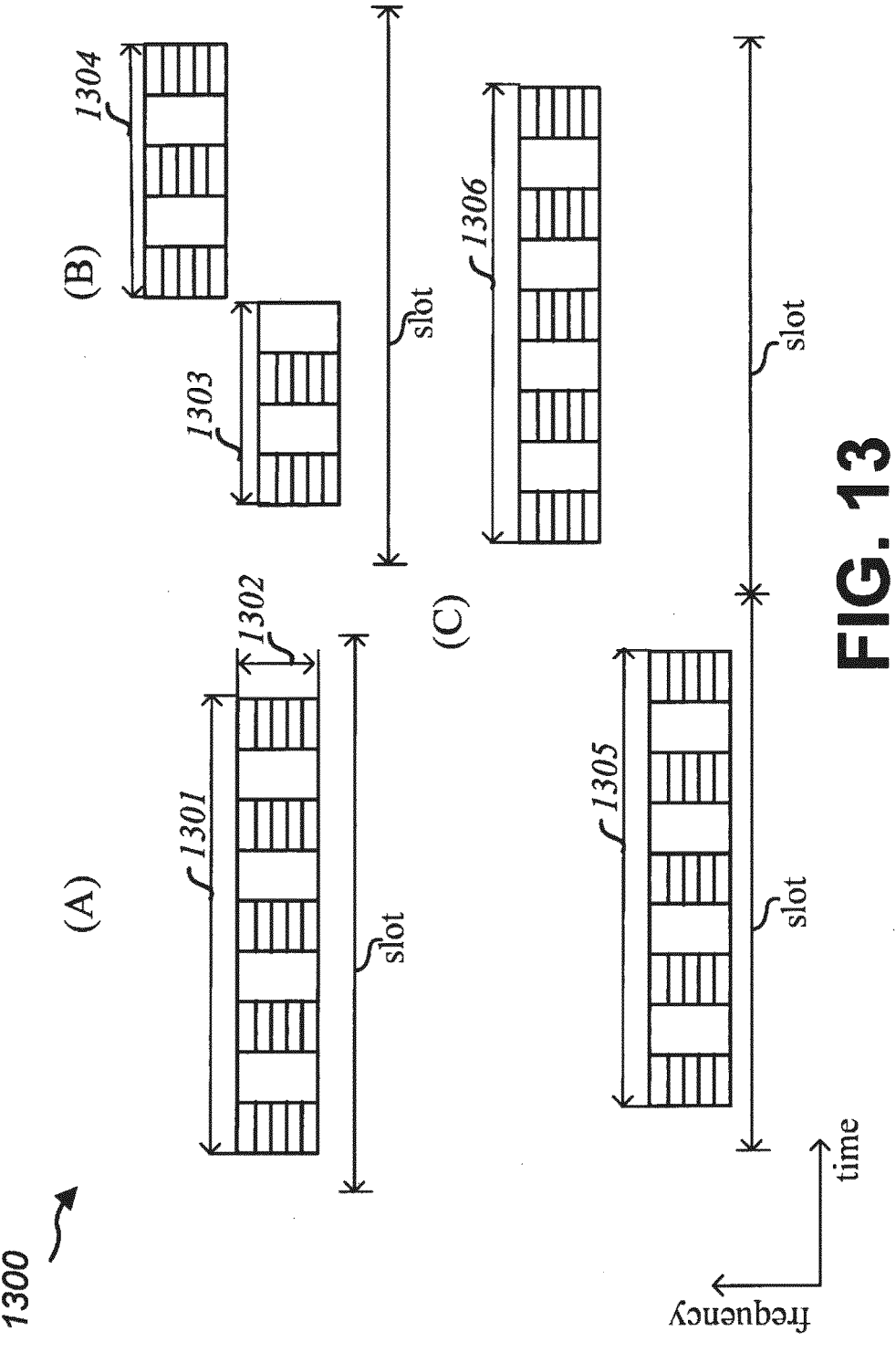
FIG. 13 is a diagram illustrating one example 1300 of PUCCH transmission/reception with or without frequency hopping by a UE 102 and a base station 160.

FIG. 13 is a diagram illustrating one example 1300 of PUCCH transmission/reception with or without frequency hopping by a UE 102 and a base station 160. In the FIG. 13, each box in the frequency domain corresponds to a resource block. Each box in the time domain corresponds to a symbol. A box marked with horizontal lines represents a DMRS symbol, while the empty box represents a complex-valued symbol. In the FIG. 13, the PUCCH transmission using PUCCH format 1 is illustrated. Configured duration (allocated duration) of a PUCCH resource for the PUCCH transmission in the time domain is 9 symbols, i.e. $N_{symb}^{PUCCH}$=9.

FIG. 13 (A) is an illustration that the PUCCH with allocated duration $N_{symb}^{PUCCH}$ 1301 is transmitted by the UE 102 without frequency hopping. 1302 represents one resource block for the PUCCH transmission in the frequency domain. DMRS symbols and complex-valued symbol(s) are alternately mapped to the symbols of the configured PUCCH resource with the PUCCH format 1. DMRS(s) for PUCCH format 1 are mapped to symbols with even indexes of the PUCCH transmission, i.e. symbols with indexes 0, 2, 4, 6. 8. The complex-valued symbol(s) are mapped to symbols with odd indexes of the PUCCH transmission, i.e. symbols with indexes 1, 3, 5, 7. Herein, a symbol with index 0 of the PUCCH transmission means the first symbol relative to the start of the PUCCH transmission, a symbol with index 1 of the PUCCH transmission means the second symbol relative to the start of the PUCCH transmission, and so on. In the FIG. 13 (A), five symbols of the PUCCH transmission are used for DMRS. On the other hand, four symbols of the PUCCH transmission are used for transmitting HARQ-ACK information and/or SR.

FIG. 13 (B) is an illustration that the PUCCH is transmitted by the UE 102 with intra-slot frequency hopping. the UE 102 may perform the PUCCH transmission in the first hop and the second hop in one slot. The PUCCH with duration $N_{symb}^{PUCCH}$ contains two hops within a slot, i.e. the first hop 1303 with duration floor($N_{symb}^{PUCCH}/2$)=4, and the second hop 1304 with duration $N_{symb}^{PUCCH}$–floor($N_{symb}^{PUCCH}/2$)=5.

FIG. 13 (C) is an illustration that the PUCCH is transmitted by the UE 102 with inter-slot frequency hopping. Herein, the UE 102 performs inter-slot frequency hopping for PUCCH transmission across 2 different slots. That is, the UE 102 may perform PUCCH transmission with 2 repetitions across 2 slots. Same symbol allocation (i.e. the starting symbol and the allocated duration for the PUCCH) is applied across these slots. The PUCCH duration $N_{symb}^{PUCCH}$ 1305 is same as the PUCCH $N_{symb}^{PUCCH}$ 1305.

Figure 14:
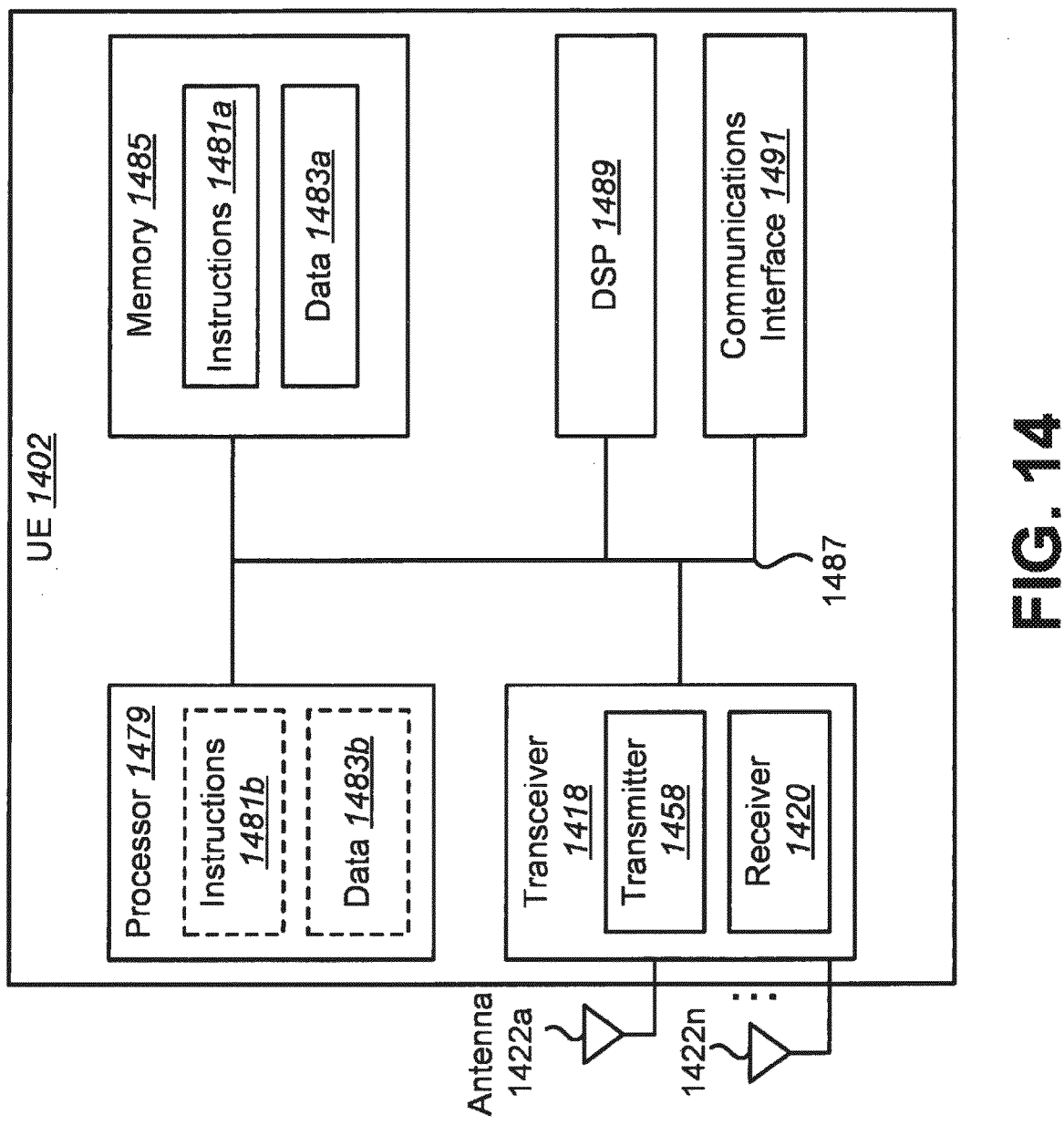
FIG. 14 illustrates various components that may be utilized in a UE.

FIG. 14 illustrates various components that may be utilized in a UE 1402. The UE 1402 (UE 102) described in connection with FIG. 14 may be implemented in accordance with the UE 102 described in connection with FIG. 1. The UE 1402 includes a processor 1481 that controls operation of the UE 1402. The processor 1481 may also be referred to as a central processing unit (CPU). Memory 1487, which may include read-only memory (ROM), random access memory (RAM), a combination of the two or any type of device that may store information, provides instructions 1483a and data 1485a to the processor 1481. A portion of the memory 1487 may also include non-volatile random access memory (NVRAM). Instructions 1483b and data 1485b may also reside in the processor 1481. Instructions 1483b and/or data 1485b loaded into the processor 1481 may also include instructions 1483a and/or data 1485a from memory 1487 that were loaded for execution or processing by the processor 1481. The instructions 1483*b* may be executed by the processor 1481 to implement one or more of the methods 200 described above.

The UE 1402 may also include a housing that contains one or more transmitters 1458 and one or more receivers 1420 to allow transmission and reception of data. The transmitter(s) 1458 and receiver(s) 1420 may be combined into one or more transceivers 1418. One or more antennas 1422*a-n* are attached to the housing and electrically coupled to the transceiver 1418.

The various components of the UE 1402 are coupled together by a bus system 1489, which may include a power bus, a control signal bus and a status signal bus, in addition to a data bus. However, for the sake of clarity, the various buses are illustrated in FIG. 14 as the bus system 1489. The UE 1402 may also include a digital signal processor (DSP) 1491 for use in processing signals. The UE 1402 may also include a communications interface 1493 that provides user access to the functions of the UE 1402. The UE 1402 illustrated in FIG. 14 is a functional block diagram rather than a listing of specific components.

Figure 15:
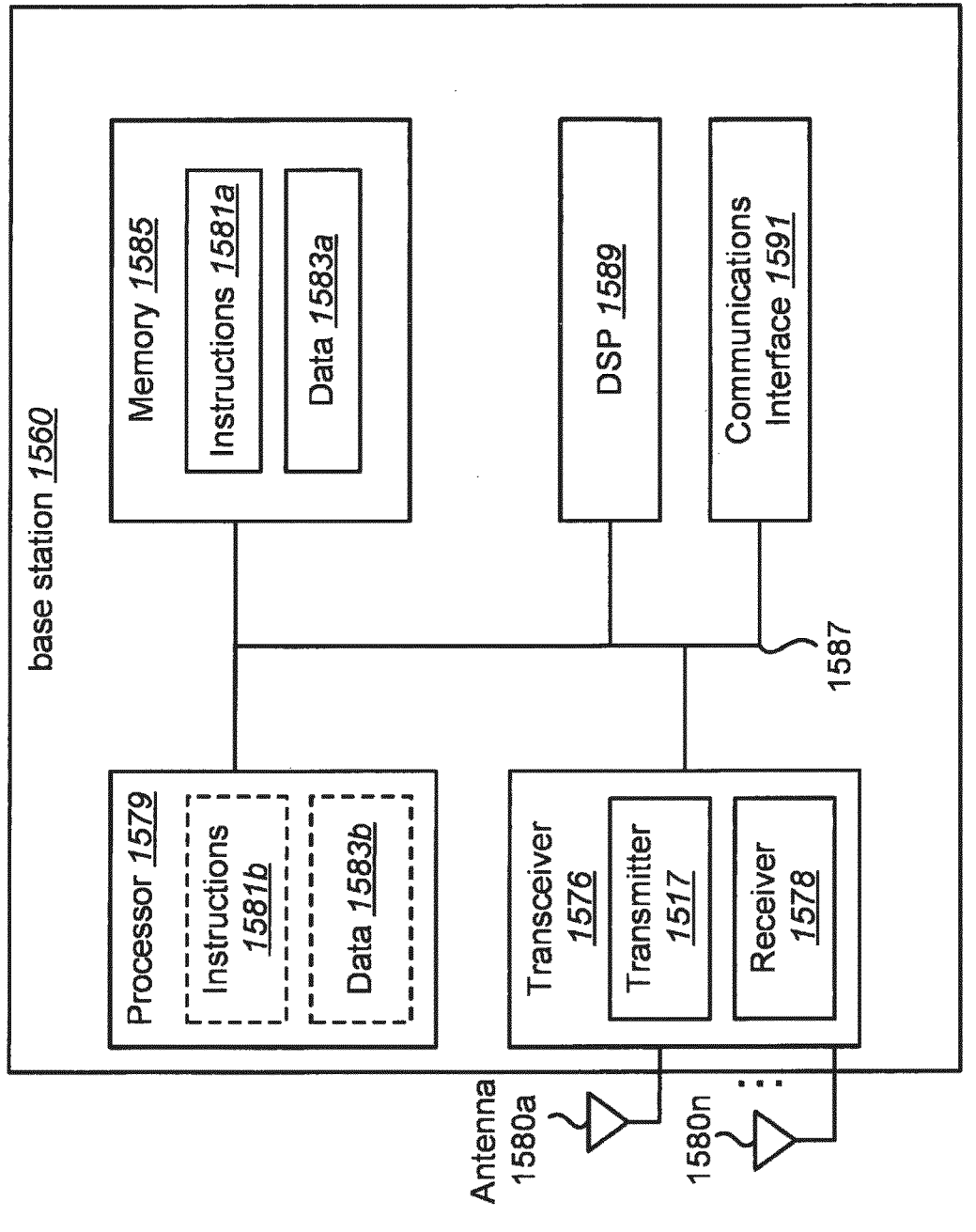
FIG. 15 illustrates various components that may be utilized in a base station.

FIG. 15 illustrates various components that may be utilized in a base station 1560. The base station 1560 described in connection with FIG. 15 may be implemented in accordance with the base station 160 described in connection with FIG. 1. The base station 1560 includes a processor 1581 that controls operation of the base station 1560. The processor 1581 may also be referred to as a central processing unit (CPU). Memory 1587, which may include read-only memory (ROM), random access memory (RAM), a combination of the two or any type of device that may store information, provides instructions 1583*a* and data 1585*a* to the processor 1581. A portion of the memory 1587 may also include non-volatile random access memory (NVRAM). Instructions 1583*b* and data 1585*b* may also reside in the processor 1581. Instructions 1583*b* and/or data 1585*b* loaded into the processor 1581 may also include instructions 1583*a* and/or data 1585*a* from memory 1587 that were loaded for execution or processing by the processor 1581. The instructions 1583*b* may be executed by the processor 1581 to implement one or more of the methods 300 described above.

The base station 1560 may also include a housing that contains one or more transmitters 1517 and one or more receivers 1578 to allow transmission and reception of data. The transmitter(s) 1517 and receiver(s) 1578 may be combined into one or more transceivers 1576. One or more antennas 1580*a-n* are attached to the housing and electrically coupled to the transceiver 1576.

The various components of the base station 1560 are coupled together by a bus system 1589, which may include a power bus, a control signal bus and a status signal bus, in addition to a data bus. However, for the sake of clarity, the various buses are illustrated in FIG. 15 as the bus system 1589. The base station 1560 may also include a digital signal processor (DSP) 1591 for use in processing signals. The base station 1560 may also include a communications interface 1593 that provides user access to the functions of the base station 1560. The base station 1560 illustrated in FIG. 15 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using circuitry, a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

The invention claimed is:

1. A user equipment (UE), comprising:

reception circuitry configured to receive, from a base station, system information including a first RRC parameter and a second RRC parameter, wherein the first RRC parameter provides one or more PUCCH resources in an initial UL BWP, and to receive a PDCCH with a DCI format scheduling a PDSCH; and transmission circuitry configured to transmit, on a PUCCH resource of the one or more PUCCH resources, a PUCCH with HARQ-ACK information in response to the PDSCH received, wherein whether a PRB index of the PUCCH resource is determined by using a size of the initial UL BWP or by not using the size of the initial UL BWP is determined based on the second RRC parameter.

2. The UE of the claim 1: wherein in a case that the second RRC parameter is set to a first value, the PRB index is determined by using a first formula wherein the first formula does not use the size of the initial UL BWP as one of terms of the first formula, in a case that the second RRC parameter is set to a second value, the PRB index is determined by using a second formula wherein the second formula uses the size of the initial UL BWP as one of terms of the second formula.

3. The UE of the claim 2: wherein the UE performs the PUCCH transmission without frequency hopping.

4. A base station, comprising:

transmission circuitry configured to transmit, to a user equipment (UE), system information including a first RRC parameter and a second RRC parameter, wherein the first RRC parameter provides one or more PUCCH resources in an initial UL BWP, and to transmit a PDCCH with a DCI format scheduling a PDSCH; and reception circuitry configured to receive, on a PUCCH resource of the one or more PUCCH resources, a PUCCH with HARQ-ACK information in response to the PDSCH received, wherein whether a PRB index of the PUCCH resource is determined by using a size of the initial UL BWP or by not using the size of the initial UL BWP is determined based on the second RRC parameter.

5. The base station of the claim 4: wherein
in a case that the second RRC parameter is set to a first value, the PRB index is determined by using a first formula wherein the first formula does not use the size of the initial UL BWP as one of terms of the first formula,
in a case that the second RRC parameter is set to a second value, the PRB index is determined by using a second formula wherein the second formula uses the size of the initial UL BWP as one of terms of the second formula.

6. The base station of the claim 4: wherein
the base station receives the PUCCH transmission without frequency hopping.

7. A communication method performed by a user equipment (UE), comprising:
receiving, from a base station, system information including a first RRC parameter and a second RRC parameter, wherein the first RRC parameter provides one or more PUCCH resources in an initial UL BWP; and
receiving a PDCCH with a DCI format scheduling a PDSCH; and
transmitting, on a PUCCH resource of the one or more PUCCH resources, a PUCCH with HARQ-ACK information in response to the PDSCH received, wherein whether a PRB index of the PUCCH resource is determined by using a size of the initial UL BWP or by not using the size of the initial UL BWP is determined based on the second RRC parameter.

\* \* \* \* \*